United States Patent
Perlmutter et al.

(10) Patent No.: US 7,689,036 B2
(45) Date of Patent: Mar. 30, 2010

(54) CORRECTION OF BLOTCHES IN COMPONENT IMAGES

(75) Inventors: Keren O. Perlmutter, Pacific Palisades, CA (US); Sharon M. Perlmutter, Pacific Palisades, CA (US)

(73) Assignees: Warner Bros. Entertainment Inc., Burbank, CA (US); AOL LLC, Dulles, VA (US)

(*) Notice: Subject to any disclaimer, the term of this patent is extended or adjusted under 35 U.S.C. 154(b) by 1218 days.

(21) Appl. No.: 11/236,805

(22) Filed: Sep. 28, 2005

(65) Prior Publication Data
US 2006/0067574 A1     Mar. 30, 2006

Related U.S. Application Data

(60) Provisional application No. 60/613,939, filed on Sep. 29, 2004.

(51) Int. Cl.
*G06K 9/34* (2006.01)
(52) U.S. Cl. ..................... 382/164
(58) Field of Classification Search ........... 382/164
See application file for complete search history.

(56) References Cited

U.S. PATENT DOCUMENTS

| | | | |
|---|---|---|---|
| 5,613,013 A | 3/1997 | Schuette et al. | |
| 6,208,749 B1 | 3/2001 | Gutkowicz-Krusin et al. | |
| 6,542,199 B1 | 4/2003 | Manbeck et al. | |
| 6,624,844 B1 | 9/2003 | Manbeck et al. | |
| 6,718,068 B1 | 4/2004 | Gindele et al. | |
| 6,850,651 B2 | 2/2005 | Zaklika et al. | |
| 7,046,909 B2 | 5/2006 | Manbeck | |
| 2001/0031128 A1 | 10/2001 | Manbeck | |
| 2002/0021365 A1 | 2/2002 | Yang et al. | |
| 2002/0180885 A1 | 12/2002 | Manbeck et al. | |
| 2004/0036765 A1 | 2/2004 | Manbeck et al. | |
| 2004/0101195 A1* | 5/2004 | Akaishi | 382/162 |
| 2005/0152458 A1 | 7/2005 | Tanaka | |

OTHER PUBLICATIONS

Ali Gangal, An improved motion-compensated restoration method for damaged color motion picture films, Feb. 2004, Signal Processing: Image Communication vol. 19, Issue 4, pp. 353-368.*

(Continued)

*Primary Examiner*—Vikkram Bali
*Assistant Examiner*—Max Shikhman
(74) *Attorney, Agent, or Firm*—Fish & Richardson P.C.

(57) ABSTRACT

Blotches may be identified and processed to reduce or eliminate the blotch. The blotch may be in just one of several separations and multiple separations may be used, for example, to identify the blotch. An implementation (i) compares a first component image of an image with a first component image of a reference image, (ii) compares a second component image of the image with a second component image of the reference image, and (iii) determines based on these comparisons whether the first component image of the image includes a blotch. Multiple image separations also, or alternatively, may be used, for example, to modify the blotch, as well as to evaluate whether a modification is beneficial.

30 Claims, 13 Drawing Sheets
(2 of 13 Drawing Sheet(s) Filed in Color)

OTHER PUBLICATIONS

Van Roosmalen, P.M.B., "Restoration of Archived Film and Video," Thesis Delft University of Technology, Universal Press, 1999, 156 pages.

Saito T. et al, "Image Processing for Restoration on Heavily-Corrupted Old Film Sequences", Los Alamitos, CA, USA, vol. 3, Sep. 3, 2000, pp. 13-16.

Tenze, L. et al, "Blotches Correction and Contrast Enhancement For Old Film Pictures", Piscataway, NJ, USA, Sep. 10, 2000, pp. 660-663.

International Search Report, 6 pages.

Written Opinion of the International Searching Authority, 5 pages.

MTI Digital Restoration Services, www.mathtech.com, published Dec. 6, 2000, 3 pages.

MTI Digital Restoration Services, www.mathtech.com, published May 17, 2001, 7 pages.

Mathematical Technologies Inc., "Mathematical Technologies Delivers Intellideck on New SGI Platforms", www.mathtech.com, published Apr. 23, 2001, 1 page.

International Search Report, 6 pages, Sep. 29, 2004.

Written Opinion of the International Searching Authority, 5 pages, Sep. 29, 2004.

* cited by examiner

CORRECTION OF BLOTCHES IN COMPONENT IMAGES

RELATED APPLICATIONS

This application claims priority from U.S. Provisional Application Ser. No. 60/613,939, filed Sep. 29, 2004, and titled "Correction of Blotches in Separations," which is hereby incorporated by reference.

TECHNICAL FIELD

This disclosure relates to image processing.

BACKGROUND

Color motion picture film is a relatively recent development. Before the advent of color film stock in the 1950s, a process for making color motion pictures included capturing color information on two or more reels of black and white film. In the original Technicolor three color film separation process, three reels of black and white film were loaded into a specially-designed movie camera. The light coming through the lens was split into three primary colors of light and each was recorded on a separate reel of black and white film. After developing the three reels, three photographic negatives representing the yellow (inverted blue), the cyan (inverted red), and the magenta (inverted green) portion of the original reels were created.

In addition to the creation of color separations through the original Technicolor process, color separations also have been produced and used for the archival of color film because black and white film stock generally has a much greater shelf-life than color film. In this process, the color film stock is used to expose one reel of black and white film with sequential records of red, green, and blue so that each frame is printed three times on the resultant reel to form a sequential separation.

Film studios may recombine the three color separations onto a single reel of color film using a photographic process that is performed in a film laboratory. The resulting destination reel, called an interpositive ("IP"), contains colors represented as red, green, and blue (as opposed to cyan, magenta, and yellow).

SUMMARY

The film processes described earlier, as well as other processes, may be subject to one or more of a variety of well-known film distortions, including differential resolution, loss of resolution, static misregistration, dynamic misregistration, and blotches, for example. Although referenced with respect to film, these distortions may be present in other applications and environments. For example, correction of blotches within separations may be required, and one or more distortions may be present, in film, photography, astronomy, and medical applications.

Moreover, various conditions may lead to these and other distortions. For example, blotches may arise on a separation or an IP due to dirt, such as, for example, dust particles, covering the film, a loss of gelatin covering the film, or other factors. These blotches may be manifested as dark or bright areas on the displayed film.

Digital image processing can be used to restore film with blotches. Each digital image includes an array of pixels having a dimensionality that may be quantified by multiplying the image width by the image height. Within the array, each pixel location (x, y), where 0<=x<width and 0<=y<height, has an associated gray-level value I(x, y), where 0<=I(x, y)<=65,535 (in the case of 16-bit data), that represents how much of the particular color (for example, red, green, or blue) is present at the corresponding pixel location (x, y). One aspect of digital image processing can include the process of modifying the digitized representation of a color component image that contains blotches in order to reduce these blotches. This and other processes may use information from the digitized representation of the other color component images for the frame as well as information from the digitized representation of the color component images from other frames within a sequence.

And, more generally, various general aspects address methods for the restoration of blotches within separations or images that may correspond to separations that relate to film or other fields.

In some of the implementations to follow, one or more of the following features may be achieved: (1) an automatic blotch correction process for color film separations, (2) a process that operates in the digital domain to enable the use of a number of digital image processing techniques, (3) a method requiring minimal human intervention, (4) a technique capable of determining where blotches occurs within an image, and (5) a method to modify the pixels of an image in order to decrease the blotches within the image. In addition, one or more of the described distortions may be compensated, corrected, or reduced. The implementations described may be applied to various types of component images, including, for example, color component images and non-color component images, and the component images may correspond to separations or to component images generated by other techniques.

According to a general aspect, processing images containing a blotch includes accessing one or more component images of a target image, the target image including a first component image and a second component image. Processing the images also includes accessing one or more component images of a reference image, the reference image including a first component image and a second component image. A motion vector is determined characterizing motion between the target image and the reference image. Based on motion indicated by the motion vector, the first component image of the target image is compared with the first component image of the reference image to produce a first-component comparison result. Based on motion indicated by the motion vector, the second component image of the target image is compared with the second component image of the reference image to produce a second-component comparison result. Processing the images further includes determining that the first component image of the target image includes a blotch based on the first-component comparison result and the second-component comparison result.

Implementations of the above general aspect may include one or more of the following features. For example, the first and/or second component images of the target image may include a color image. The target image may include a color image. The determined motion vector may be based on at least a portion of the first component image of the target image and at least a portion of the second component image of the target image.

Comparing the first component image of the target image with the first component image of the reference image may include determining a first-component difference between intensities of (i) a given pixel having a given location in the first component image of the target image and (ii) a corresponding pixel in the first component image of the reference image, the corresponding pixel in the first component image of the reference image being determined based on motion indicated by the motion vector. Comparing the second component image of the target image with the second component image of the reference image may include determining a second-component difference between intensities of (i) a pixel having the given location in the second component image of the target image and (ii) a corresponding pixel in the second component image of the reference image, the corresponding pixel in the second component image of the reference image being determined based on motion indicated by the motion vector. Determining that the first component image of the target image includes the blotch may include identifying the given pixel as being part of the blotch based on the first-component difference and the second-component difference.

A third-component difference may be determined between intensities of (i) a pixel having the given location in a third component image of the target image and (ii) a corresponding pixel in a third component image of the reference image, the corresponding pixel in the third component image of the reference image being determined based on motion indicated by the motion vector. Identifying the given pixel as being part of the blotch may include identifying the given pixel as being part of the blotch if: (i) the first-component difference minus the second-component difference exceeds a first/second-component threshold, (ii) the first-component difference minus the third-component difference exceeds a first/third-component threshold, (iii) the second-component difference is less than a second-component threshold, and (iv) the third-component difference is less than a third-component threshold.

Determining the motion vector may include determining a first value for first-component distortion characterizing distortion in the first component image of the target image associated with applying a first candidate motion vector to the first component image of the target image. Determining the motion vector may include determining a first value for second-component distortion characterizing distortion in the second component image of the target image associated with applying the first candidate motion vector to the second component image of the target image. Determining the motion vector may include determining a first value for a distortion function characterizing distortion from multiple component images of the target image associated with applying the first candidate motion vector to the multiple component images of the target image.

Determining the motion vector may include determining a second value for first-component distortion characterizing distortion in the second component image of the target image associated with applying a second candidate motion vector to the first component image of the target image. Determining the motion vector may include determining a second value for second-component distortion characterizing distortion in the second component image of the target image associated with applying the second candidate motion vector to the second component image of the target image.

Determining the motion vector may include determining a second value for the distortion function characterizing distortion from multiple component images of the target image associated with applying the second candidate motion vector to the multiple component images of the target image.

Determining the motion vector may include evaluating the second candidate motion vector based on the relative values of the first and second values of (1) first-component distortion, (2) second-component distortion, and (3) the distortion function. Evaluating the second candidate motion vector may include making a determination that the first value of at least one of (1) first-component distortion, (2) second-component distortion, and (3) the distortion function is less than the respective second value. Evaluating the second candidate motion vector may include favoring the second candidate motion vector based on the made determination. Making the determination may include making a determination that the first value of at least two of (1) first-component distortion, (2) second-component distortion, and (3) the distortion function is less than the respective second value.

Determining the motion vector may include determining a first value for third-component distortion characterizing distortion in a third component image of the target image associated with applying the first candidate motion vector to the third component image of the target image. Determining the motion vector may include determining a second value for third-component distortion characterizing distortion in the third component image of the target image associated with applying the second candidate motion vector to the third component image of the target image.

Determining the motion vector may include making a component-distortion determination that the first value of at least two of (1) first-component distortion, (2) second-component distortion, and (3) third-component distortion are less than the respective second value. Determining the motion vector may include making a distortion-function determination that the first value of the distortion function is less than the second value of the distortion function. Determining the motion vector may include favoring the second candidate motion vector based on the component-distortion determination and the distortion-function determination.

An extent of the blotch in the first component image of the target image may be determined. The motion vector may be refined based on the determined extent of the blotch.

A corresponding extent may be determined in the first component image of the reference image that corresponds to the extent of the blotch in the first component image of the target image. The blotch may be modified in the first component image of the target image using information from the corresponding extent in the first component image of the reference image. A region may be determined in the first component image of the target image that includes more than the determined extent of the blotch. A blotch distortion value may be determined for the determined region that includes the modification of the blotch in the first component image of the target image. A corresponding extent may be determined in the second component image of the target image that corresponds to the extent in the first component image of the target image. A corresponding extent may be determined in the second component image of the reference image that corresponds to the extent in the first component image of the target image. The corresponding extent in the second component image of the target image may be modified using information from the corresponding extent in the second component image of the reference image. A corresponding region in the second component image of the target image may be determined that corresponds to the determined region. A corresponding-region distortion value may be determined for the corresponding region that includes the modification of the corresponding extent in the second component image of the target image. The modification of the blotch in the first component image of the target image may be evaluated based on the blotch distortion value and the corresponding-region distortion value.

The motion vector may be tested using the second component image of the target image. Testing the motion vector using the second component image of the target image may include determining an extent of the blotch in the first component image of the target image. Testing the motion vector using the second component image of the target image may include applying the motion vector to pixels in a corresponding extent of a digital representation of the second component image of the target image, the corresponding extent including pixels that correspond to the determined extent of the blotch. Testing the motion vector using the second component image of the target image may include determining a blotch distortion value for the application of the motion vector to the pixels in the corresponding extent.

Testing the motion vector using the second component image of the target image may include determining a region in the first component image of the target image that includes more than the determined extent of the blotch. Testing the motion vector using the second component image of the target image may include applying the motion vector to pixels in the digital representation of the second component image of the target image that are in a corresponding region but not in the corresponding extent, the corresponding region includes pixels that correspond to the determined region. Testing the motion vector using the second component image of the target image may include determining a non-blotch distortion value for the application of the motion vector to pixels that are in the corresponding region but not in the corresponding extent.

Testing the motion vector using the second component image of the target image may include evaluating the motion vector based on the blotch distortion value and the non-blotch distortion value. Evaluating the motion vector may include determining a difference between the blotch distortion value and the non-blotch distortion value, comparing the difference to a difference threshold, and evaluating the motion vector based on a result obtained from comparing the difference to the difference threshold.

A spatial correction may be performed in the first component image of the target image to modify the blotch. The spatial correction may be applied to the second component image of the target image. A spatial-correction distortion value may be determined for the application of the spatial correction to the second component image of the target image. The spatial-correction distortion value may be compared to a spatial-correction distortion threshold. The spatial correction of the first component image of the target image may be evaluated based on a result obtained from comparing the spatial-correction distortion value to the spatial-correction distortion threshold. Determining the spatial-correction distortion value may include determining a distortion value between (1) the second component image of the target image before applying the spatial correction and (2) the second component image of the target image after applying the spatial correction.

A correction may be performed in the first component image of the target image to modify the blotch. The correction may be evaluated using the second component image of the target image.

Evaluating the correction using the second component image of the target image may include determining a first-component distortion value characterizing distortion from performing the correction in the first component image of the target image. Evaluating the correction using the second component image of the target image may include performing the correction in the second component image of the target image. Evaluating the correction using the second component image of the target image may include determining a second-component distortion value characterizing distortion from performing the correction in the second component image of the target image. Evaluating the correction using the second component image of the target image may include comparing the first-component distortion value with the second-component distortion value to produce a result. Evaluating the correction using the second component image of the target image may include evaluating the correction in the first component image of the target image based on the result. The first-component distortion value may be based on a ratio of (i) a variance, before modification, of a particular region in the first component image of the target image, the particular region including the blotch, and (ii) a variance of the particular region after modification of the blotch.

According to another general aspect, one or more component images of a target image are accessed, the target image including a first component image. It is determined that the first component image of the target image includes a blotch. A metric is determined for the blotch. The metric is determined for a region of the first component image that connects to the blotch, wherein a region connects to the blotch if the region touches the blotch. The metric for the blotch is compared with the metric for the region to produce a result. Based on the result, it is determined whether to include the region in the blotch.

Implementations of the above general aspect may include one or more of the following features. For example, the metric may include a distortion function. Determining the metric for the blotch may include determining a value of the distortion function for the blotch. Determining the metric for the region may include determining a value of the distortion function for the region.

The metric may include an intensity value. Determining the metric for the blotch may include determining an average intensity value for the blotch. Determining the metric for the region may include determining an average intensity value for the region.

The metric may include a direction of a gradient of intensity values. Determining the metric for the blotch may include determining a direction of a gradient of intensity values for the blotch. Determining the metric for the region may include determining a direction of a gradient of intensity values for the region.

According to another general aspect, one or more digital component images of a target image are accessed, the target image including a first component image that includes pixels. It is determined that the first component image of the target image includes a blotch. A non-blotch pixel is identified that is connected to the blotch but is not in the blotch, wherein a pixel connects to the blotch if the pixel touches the blotch on one or more of a side or a corner. A count is determined of blotch neighbors for the non-blotch pixel, the blotch neighbors being those pixels that are (1) connected to the non-blotch pixel and (2) included in the blotch. A count is determined of non-blotch neighbors for the non-blotch pixel, the non-blotch neighbors being those pixels that are (1) connected to the non-blotch pixel and (2) not included in the blotch. The count of blotch neighbors is compared to the count of non-blotch neighbors. Based on a result obtained from comparing the count of blotch neighbors to the count of non-blotch neighbors, it is determined whether to include the non-blotch pixel in the blotch.

Implementations of the above general aspect may include one or more of the following features. For example, comparing the count of blotch neighbors to the count of non-blotch neighbors may include determining whether the count of blotch neighbors is larger than the count of non-blotch neighbors. Determining whether to include the non-blotch pixel in the blotch based on a result obtained from comparing may include determining to include the non-blotch pixel in the blotch if the count of blotch neighbors is larger than the count of non-blotch neighbors.

According to another general aspect, a software carrier has stored thereon an image, the image including an irregularly-shaped modified blotch. The modified blotch has color that is similar to, but different from, color of a neighboring area, such that the difference defines a border between the modified blotch and the neighboring area.

Implementations of the above general aspect may include one or more of the following features. For example, the image may be part of a series of images of a particular scene, the series of images representing the particular scene at different points in time. Color of the modified blotch may match color of a corresponding portion of another image in the series of images.

The image may include an artifact from a blotch modification process, the artifact being adjacent to the modified blotch and having color that differs substantially from color of the modified blotch. The artifact may include a portion of a blotch, the portion being free of modifications from the blotch modification process. The modified blotch may include a modification of another portion of the blotch.

The various aspects, implementations, and features may be implemented using, for example, one or more of a method, an apparatus, an apparatus for performing a method, a program or other set of instructions, an apparatus that includes a program or other set of instructions, and a software carrier. The software carrier may include, for example, instructions, software, images, and other data.

One or more implementations are set forth in the accompanying drawings and the description below. Other implementations will be apparent from the description, drawings, and claims.

DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Multiple component images of a target image (the target image typically being referred to throughout this disclosure as an image) may be used in a variety of operations in the process of identifying and modifying a given blotch. The operations include, for example, identifying a blotch, determining a motion vector, refining the motion vector based on the blotch, and evaluating the efficacy of a modification of the blotch.

One implementation compares each of multiple color components of an image with a corresponding color component of a reference image to assist in identifying a blotch in one of the color components of the image. The blotch is identified, in part, because the blotch will differ from the corresponding location in the reference image. After identifying the blotch, the implementation evaluates the modification by performing a corresponding modification on a color component image that does not have the blotch, and examining the corresponding modification to verify that a relatively small change occurred in the corresponding modification compared to the modification.

Figure 1A:
FIG. 1A is a color picture illustrating a few blotches on a frame from a movie. Three noticeable blotches (2 red, 1 green) are circled on the figure.
Figure 1B:
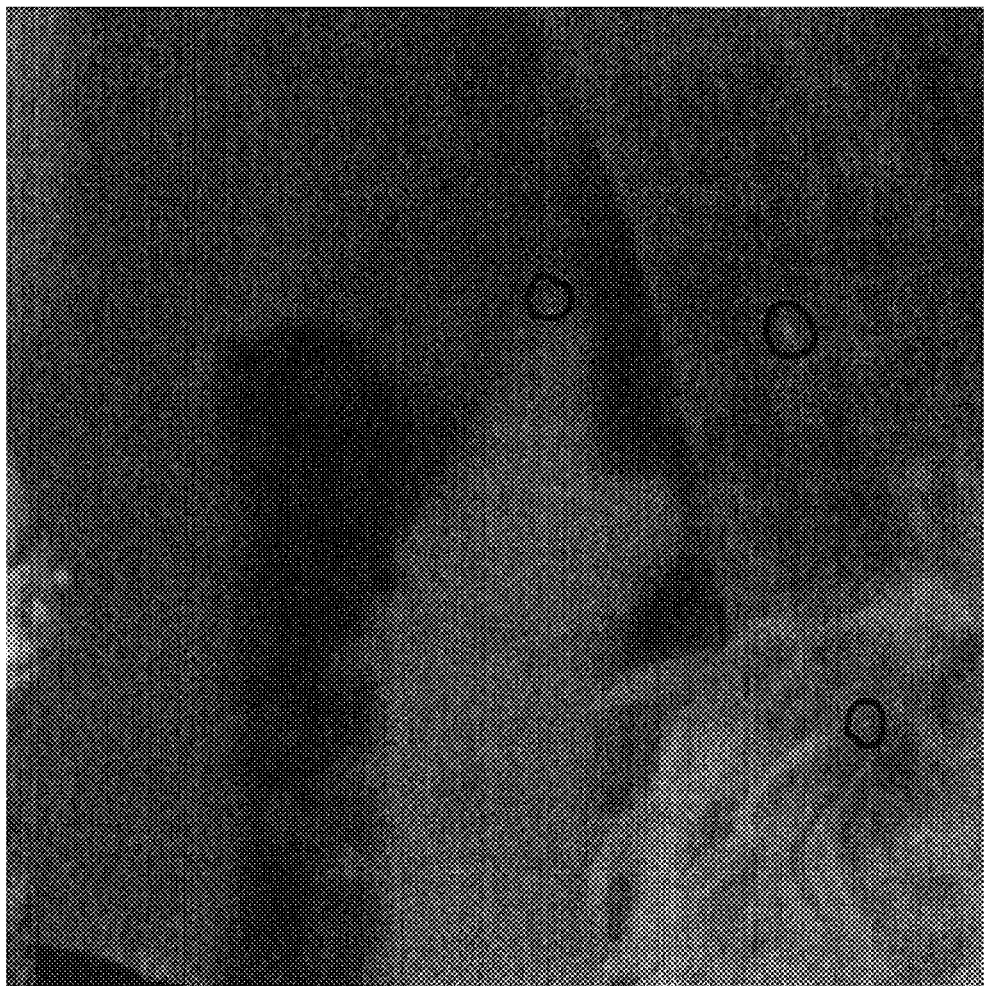
FIG. 1B is a non-color version of FIG. 1A.
Figure 2:
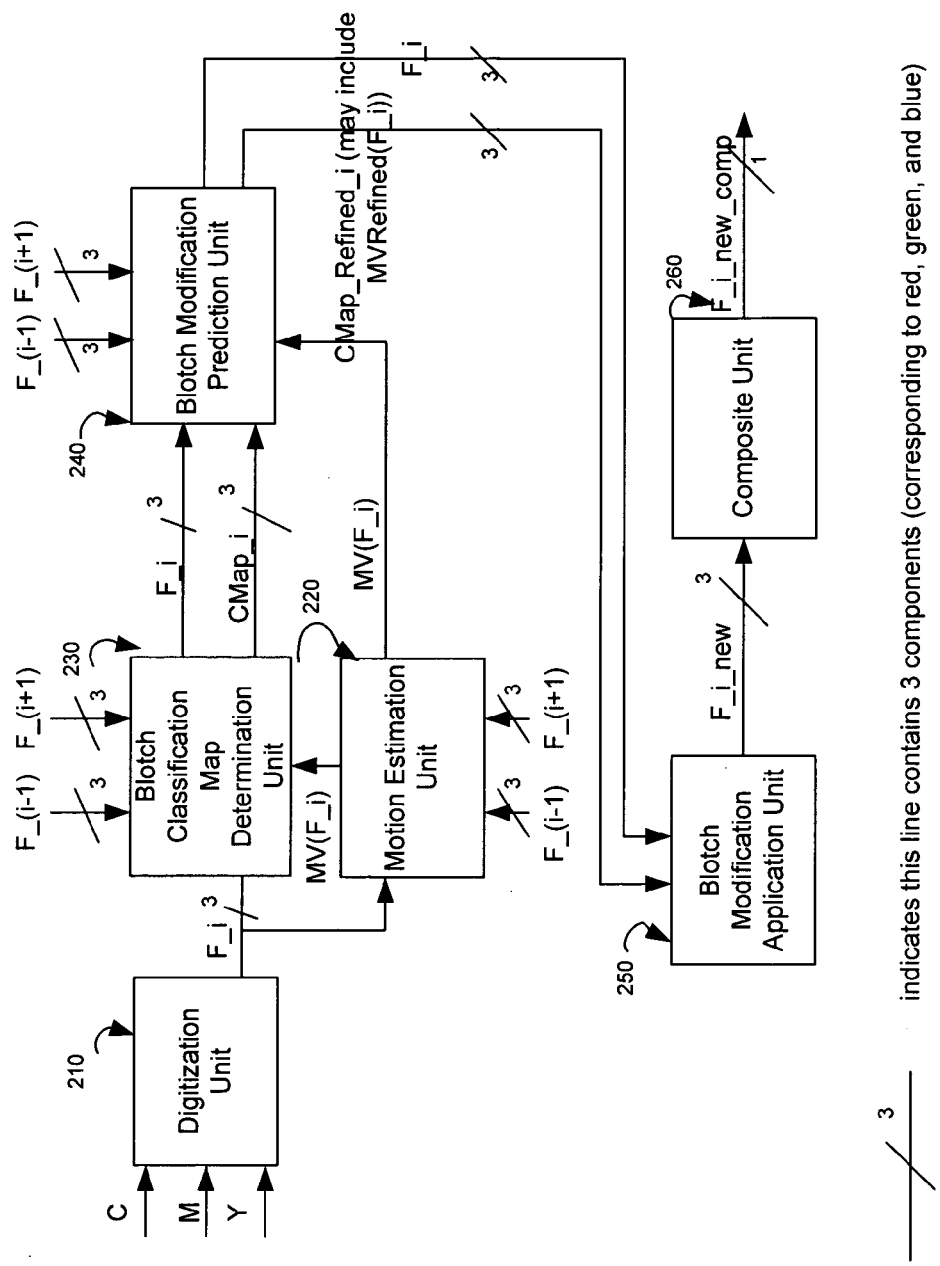
FIG. 2 is a block diagram of an implementation of a blotch correction method.

FIGS. 1A and 1B illustrate one visual manifestation of blotches that can occur due to one or more sources of distortion. FIG. 2 illustrates a system 200 that provides one implementation for performing the blotch correction. As shown, digitization unit 210 receives a sequence of frames, each consisting of either three color component images or a single composite color image composed of three color component images, and outputs a sequence of frames, each consisting of three digital, and possibly transformed, color component images. A motion estimation unit 220 inputs the sequence of frames and computes a set of motion vectors to characterize the motion between a particular frame and a set of one or more reference frames.

A blotch classification map determination unit 230 receives the set of digital images and motion vectors, and processes them to produce a classification map that is provided to a blotch modification prediction unit 240. The blotch modification prediction unit 240 uses the classification map, the motion vectors, and the set of digital images to determine whether the blotch modification should occur on the pixels identified by the classification map determination unit, and if so, the type of modification that should be applied. For example, the blotch modification prediction unit 240 applies additional operations, including a recalculation of motion vectors, in order to ensure that blotch modification would not introduce artifacts at the previously determined blotch locations.

A blotch modification application unit 250 modifies the pixels identified as part of a blotch so as to reduce the blotch and restore the pixels to values that would more closely represent the original, unblotched pixels. Finally, a composite phase unit 260 combines the modified images into a composite image.

Figure 3:
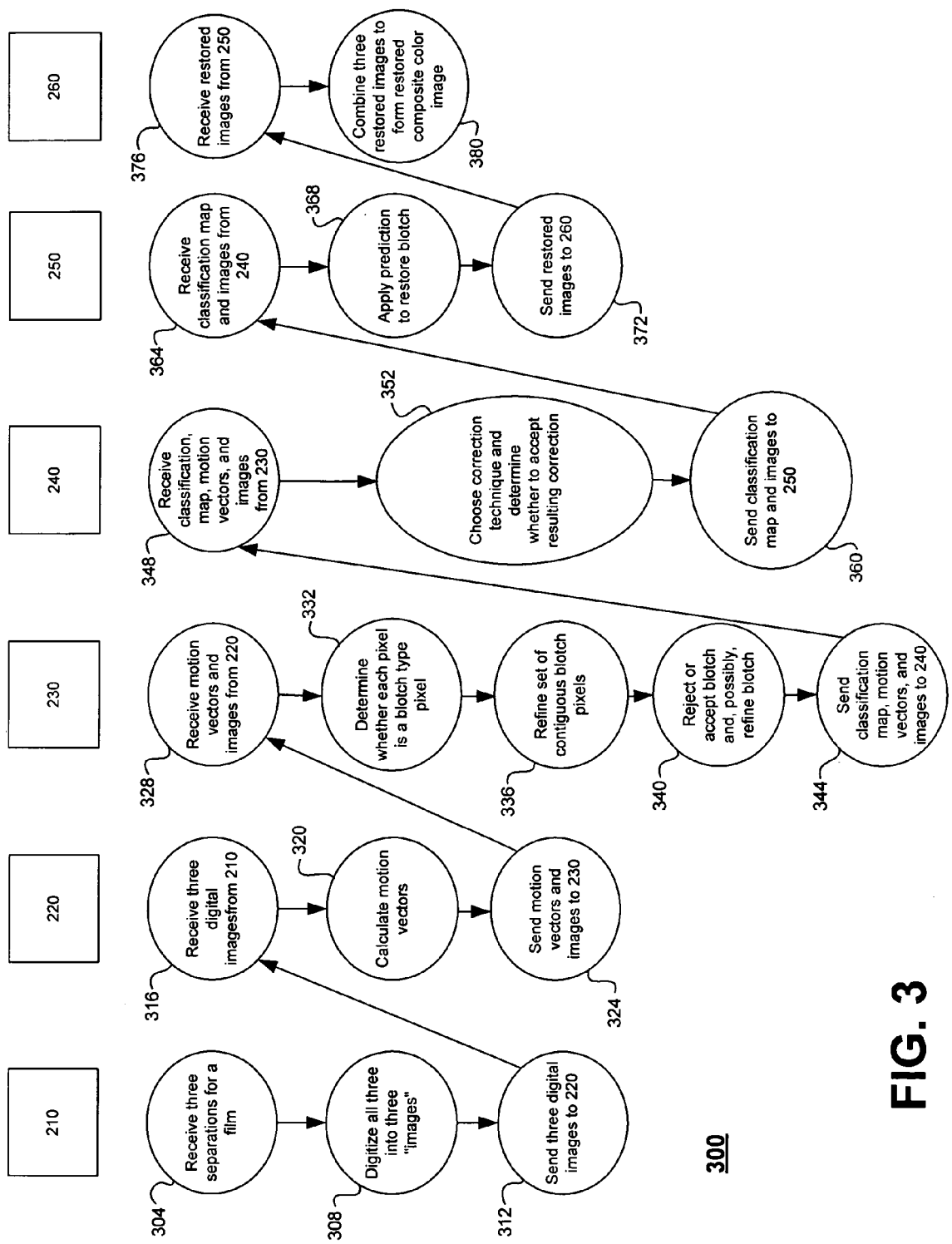
FIG. 3 is a flow diagram of the components illustrated in FIG. 2.

One or more of the units 210-260 may be applied more than once in some implementations. FIG. 3 is a flow diagram 300 of the components illustrated in FIG. 2 and is discussed below in conjunction with a more detailed discussion of the components of the system 200.

As noted above, the digitization unit 210 may receive multiple color separations at multiple points in time (304). The digitization unit 210 typically accepts multiple photographic negative images (for example, yellow, cyan, and magenta) and typically outputs multiple photographic positive images (for example, blue, red, and green) as digital data (308). The digital data typically consists of a set of gray-level pixels. The three separations may be input to digitization unit 210 one at a time in their entirety, at the same time in parallel, or may be interleaved so that corresponding frames from each separation are input serially adjacent to each other.

In one implementation, a composite color film is input to digitization unit 210 and digitized. Digitization unit 210 may digitize the color film and then separate the color film into one or more component images. Three color component images are commonly derived, but implementations may use varying numbers. Separating a color film, or other input, into component images, may be performed in a separate unit as an alternative to performing such an operation in digitization unit 210.

Various component images may be used. For example, a color film may be separated into RGB color component images, or YUV component images in which the U and V color components represent color rather than luminance.

The implementations described below are particularly suited to receiving an input composite color movie that has dirt (that is, a blotch) on a single color component only. A blotch (or "dirt") may be caused, for example, by actual dirt, such as dust, or by a loss of gelatin covering a film. For example, a blotch may have appeared on a single separation and then all component separations may have been combined to form the composite color movie. One or more of the implementations below also may be adapted to work with blotches that are on all of the separations, such as might happen when the composite movie itself receives a blotch.

In one implementation, the digitization unit 210 thus transforms an input negative image into a positive image, and digitizes the positive image. Another implementation performs one or more of a variety of other transformations, such as, for example, positive-to-negative, in lieu of or in addition to the negative-to-positive transformation. Another implementation performs no transformation at all. Yet another implementation accepts digitized data such that digitization is not required.

As noted above, the digital color component images of a frame are input into the motion estimation unit 220 (312, 316), and the motion estimation unit 220 determines one or more motion vectors (320). In addition, at least one set of digital color component images may be used from frames that precede, succeed, or both precede and succeed, in time, the frame under consideration.

To illustrate an implementation, define:

(i) $F\_i$ to be a frame consisting of a set of three color component images (e.g., red, green, and blue, respectively), where "i" varies from 1 to N, and (ii) $F\_i\_new$ to be a blotch-corrected frame consisting of a set of three color component images (e.g., red, green, and blue, respectively), where "i" varies from 1 to N.

Then, $MV(F\_i\_)=f(F\_(i-j), \ldots, F\_i, \ldots, F\_(i+k))$ or $MV(F\_i)=f(F\_(i-j)\_new, \ldots, F\_i, \ldots, F\_(i+k))$, where j and k are non-negative integers. That is, the motion vector corresponding to frame i can be a function of either frames that precede, succeed, or both precede and succeed frame i, in time. Or as one alternative, can be a function of blotch corrected frames that precede frame i in time, uncorrected frames that succeed frame i in time, or both. Note that the motion vector for frame i need not be based on all component images for frame i, or for the other frame(s) that are considered.

Motion vectors can be computed for each pixel within each frame with respect to a reference frame (note that a reference image, such as one component of a frame, may also be used in various implementations). For example, each frame can be subdivided into blocks (e.g., 16×16 block of pixels), and a motion vector can be computed for all pixels within each block. Motion vectors can be computed based on a function of the different color component images. For example, the luminance component of the frame can be computed as a function of the red, green, and blue component images, and the motion vectors can be computed based on the luminance component of the frame under consideration and the luminance component of the reference frame(s). Alternatively, different motion vectors can be computed for each of the red, green, and blue component images.

As an example, a motion vector may be determined based on an initial motion vector candidate. In some implementations, this initial motion vector candidate may be obtained based on a function of motion vectors of nearby blocks. In other implementations, this initial motion vector candidate may represent a zero motion vector. A distortion value based on some distortion measure may be computed for the candidate motion vector using pixels from the current frame and a reference frame. The distortion measure may be based on a function of the color component images or a function of the distortions generated on the different color component images. Distortion values associated with a number of candidate vectors (which may be obtained throughout a window around an initial candidate motion vector) may be computed for each. The candidate motion vector resulting in the lowest distortion based on the distortion measure may be selected as the "appropriate" motion vector.

As an example, the distortion measure associated with a motion vector may be based on the differences between the current and reference frame for each color component as well as the difference between the current and reference frame based on a combination of the color components. In one implementation, a motion vector is considered to produce a lower value for the distortion measure if two conditions are satisfied: (1) the difference between the luminance values between the current and reference pixels produce a lower distortion and (2) the differences for a majority of the color components (e.g., two out of three) also produce a lower distortion, compared to the corresponding distortion values obtained with other candidate motion vectors.

A scene detection unit within the motion estimation unit 220 can automatically determine whether to use reference frames that either precede or succeed the frame under consideration in time. For example, the scene detection unit can determine, based on the determined motion vectors, whether the frame under consideration is similar to the candidate reference frame. This can be determined with a variety of techniques.

For example, a distortion can be calculated between the motion compensated current frame and the candidate reference frame. If the distortion exceeds a particular threshold, the frame is considered to be too different from the reference frame, and, therefore, the reference frame is not used to provide motion vectors to the subsequent units of this process or for any other processing operations in the subsequent units of this process. The distortion can be computed as a function of the difference between the pixels within the block (or frame) of the current frame and the reference frame. For example, the distortion metric can be the sum of the absolute values of the differences between each pixel and the corresponding (motion-compensated) pixel in the reference frame.

As an example of a reference frame, the reference frame may be defined for any given target frame as the preceding frame, or the succeeding frame, in a sequence of frames (for example, in a movie) and thus the reference frame may be different for every target frame. As another example, the reference frame for all target frames in a given scene may be the first frame in the given scene and thus the reference frame may remain constant for all of the target frames in the given scene, particularly if there is little motion. As yet another example, any given frame may have multiple reference frames, for example, each the two succeeding frames and each of the two preceding frames, in which case any given frame shares one or more of its reference frames with other nearby frames.

The digital color component images corresponding to the frame under consideration as well as to the reference frame (s), and the associated motion vectors for the frame, are input into the blotch classification map determination unit 230 (324, 328). Generally, the blotch classification map determination unit 230 determines which pixels are associated with a blotch and these pixels are considered candidates to be modified in a given color component image. The determination may include one or more processing operations. In an implementation described below, the blotch classification map determination unit 230 makes an initial determination on a pixel-by-pixel basis (332), and then refines that determination (336, 340).

In one implementation of the system, the classification map determination unit 230 identifies these pixels (332) based on (i) a set of criteria applied to a set of motion compensated differences as well as (ii) the pixel intensities themselves. The classification map determination unit 230 outputs a map (labeled CMap_i, where CMap_i consists of three separate maps, $CMaP_R$, $CMap_G$, or $Cmap_B$) that constitutes an image consisting of "blotch" or "non-blotch" type pixels for each of the color component images, where the "blotch" pixels indicate at which locations blotches may occur, and where the associated pixel intensity values may be modified during a subsequent operation.

The set of criteria used to determine the locations of blotches can be based on one or more of the various properties commonly associated with blotches. These include: (1) blotches seldom occur at the same pixel location within two consecutive frames, (2) blotches seldom occur at the same pixel location within more than one digital color component image comprising a frame (for example, within more than one separation of a color frame), (3) blotches tend to occur in spatially connected pixels (i.e., they occur across small regions of pixels rather than at isolated pixel locations), (4) intensity values of pixels within a particular blotch typically are similar, and (5) intensity values of pixels within a particular blotch are typically different than the intensity values of neighboring pixels outside the particular blotch.

For each pixel p, define DFDr_p_i_j, DFD_g_p_i_j, and DFD_b_p_i_j to be the calculated displaced frame difference between pixel p in the red, green, and blue component images of frame i and the corresponding motion-compensated pixel based on red, green, and blue component images, respectively, in the reference frame j. For example, DFD_r_p_i_j can equal the absolute value of the difference between the pixel intensity value of pixel p in frame i and the pixel intensity value of the corresponding motion-compensated pixel in frame j. Alternatively, another type of distortion measure may be used to obtain DFD_r_p_i_j. A set of criteria can be applied based on these DFDs to determine an initial set of "blotch" or "non-blotch" type pixels for each of the color component images of the current frame.

Figure 4:
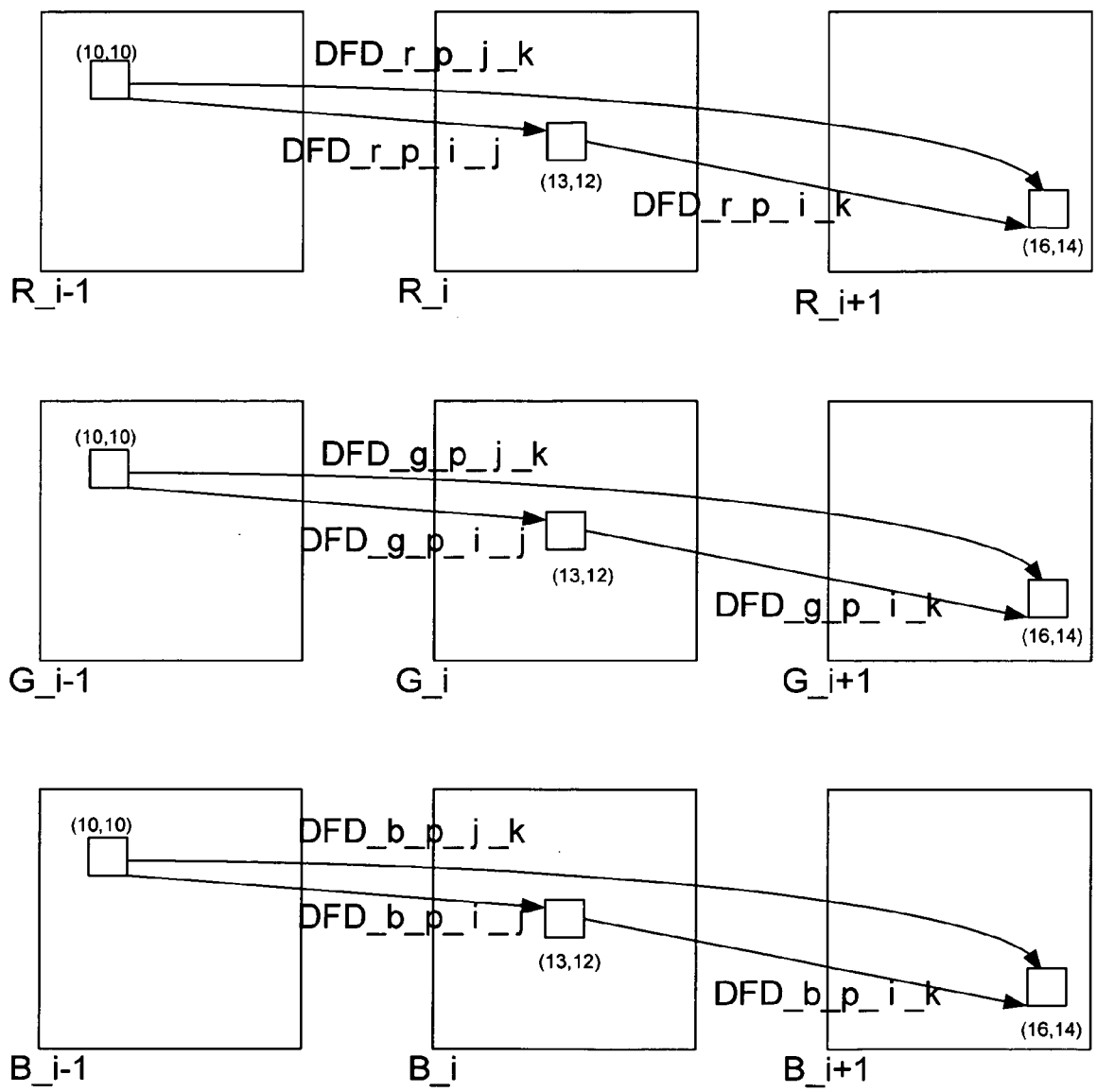
FIG. 4 illustrates the computation of difference values between a pixel within the component images of a current frame and the corresponding component images in two reference frames.

FIG. 4 illustrates red, green, and blue component images for frames i, i−1, and i+1. A pixel located at location (13, 12) in frame i is indicated by a square in each of the component images for frame i. The corresponding pixels (determined by estimating motion) in the reference frames j and k are indicated by squares with associated pixel locations (10, 10) for j and (16, 14) for k. DFD values are computed between the various component images for the pixel and are associated in the figure with arrows indicating the two components used to compute the DFD value.

FIG. 4 depicts the DFD values of DFD_r_p_i_k and DFD_r_p_j_k being computed with respect to the same pixel in frame k. However, depending on how motion is estimated, different locations in frame k may be attained. For example, DFD_r_p_j_k may be based on a motion estimate between frames j and k, and DFD_r_p_i_k may be based on a motion estimate between frames i and k. These two motion estimates, and the resulting "corresponding" pixel in frame k, may be different. Different motion estimates may result, for example, if a blotch in frame i causes a poor motion estimate between frames i and k.

To determine whether a blotch occurs on a pixel in the red component image, one set of criteria that may be applied tests for whether the displaced frame distance for one color component is higher than the displaced frame distances for the other two color components for a particular pixel. Further, the displaced frame distances can be tested with respect to two reference frames, and the two reference frames may be selected such that one precedes the current frame and one succeeds the current frame.

Pseudo-code to implement one such algorithm, for pixel "p," follows, where the value of $CMap_{R\_p}$ determines whether pixel "p" in the red component of the current frame is designated as a "blotch" pixel or not. In the pseudo-code, TH_1 through TH_6 are thresholds, $CMap_{R\_p}$ is the value of $CMap_R$ for pixel "p," and the "&&" operations require that all six of the threshold comparisons be satisfied in order for the "if" statement to be satisfied.

If (DFD_r_p_i_j>TH_1) && (DFD_r_p_i_k>TH_2) && (DFD_g_p_i_j<TH_3) && (DFD_g_p_i_k<TH_4) && (DFD_b_p_i_j<TH_5) && (DFD_b_p_i_k<TH_6) then $CMap_{R\_p}$=1,
else $CMap_{R\_p}$=0.

The thresholds listed above can be constant, or alternatively, can be adaptive based on various characteristics. For example, the threshold can differ on a film by film basis, a reel by reel basis, a frame by frame basis, a pixel by pixel basis, or on the basis of any other subset of data.

In one implementation, each of the thresholds may vary as a function of the DFDs associated with the pixel (i.e., TH_p=f_i(DFD_r_p_i_j, DFD_g_p_i_j, DFD_b_p_i_j)). For example, if the DFD for the pixel in the red component image is greater than the DFD for that pixel in the green and blue component images by particular threshold(s), where the DFD is computed relative to at least one reference frame, and if the DFD values for the pixel in the green and blue component images are smaller than particular thresholds, then the pixel is identified as a possible member of a blotch. This example may be expressed in the following pseudo-code, where TH_new1 through TH_new4 are thresholds.

In the pseudo-code below, the first four comparisons compare TH_new1 through TH_new4 to four different DFD differences for pixel "p" of frame "j." The first DFD difference is between the red and green component images, taken with respect to reference frame "j." The second DFD difference is between the red and blue component images, taken with respect to reference frame "j." The third DFD difference is between the red and green component images, taken with respect to reference frame "k." The fourth DFD difference is between the red and blue component images, taken with respect to reference frame "k."

If (DFD_r_p_i_j–DFD_g_p_i_j>TH_new1) && (DFD_r_p_i_j–DFD_b_p_i_j>TH_new2) && (DFD_r_p_i_k–DFD_g_p_i_k>TH_new3) && (DFD_r_p_i_k–DFD_b_p_i_k>T H_new4) && (DFD_g_p_i_j<TH_3) && (DFD_g_p_i_k<TH_4) && (DFD_b_p_i_j<TH_5) && (DFD_b_p_i_k<TH_6) then $CMap_{R\_p}=1$, else $CMap_{R\_p}=0$.

The new thresholds may also be constant or adaptive, e.g., TH_newi=f_i(DFD__p_i_j, DFD_g_p_i_j, DFD_b_p_i_j).

In addition, if reference frames that both precede and succeed the frame under consideration are used, an additional criterion may also be applied. In one additional criterion, a DFD value is computed between these reference frames (e.g., DFD_r_p_j_k for the red component image) and is compared to determine whether it is smaller than particular threshold(s). If the computed DFD value is smaller than the threshold, and the other conditions listed above also hold true, then the pixel would be identified as a possible member of a blotch; otherwise, it would not. When the computed DFD values are small, this may suggest that the two reference frame components are similar and that non-motion differences between the reference frame components and the current frame components are due to blotches.

After the initial set of "blotch"-type pixels have been identified (332), a refinement step (336) may be performed to remove locations that have been falsely identified as blotches and to complete partially detected blotches. For example, in one implementation, the refinement is performed on pixel locations that are adjacent to pixels that have already been identified as a candidate blotch location by incorporating spatial information. In particular, various properties of blotches and their neighborhoods have been listed above, and these properties are incorporated into the set of criteria used within this refinement step. For example, pixels that are neighbors of a pixel that has already been identified as part of a blotch can be examined to see how similar they are. Similarity can be with respect to various characteristics, such as intensity values or DFD values.

Figure 5:
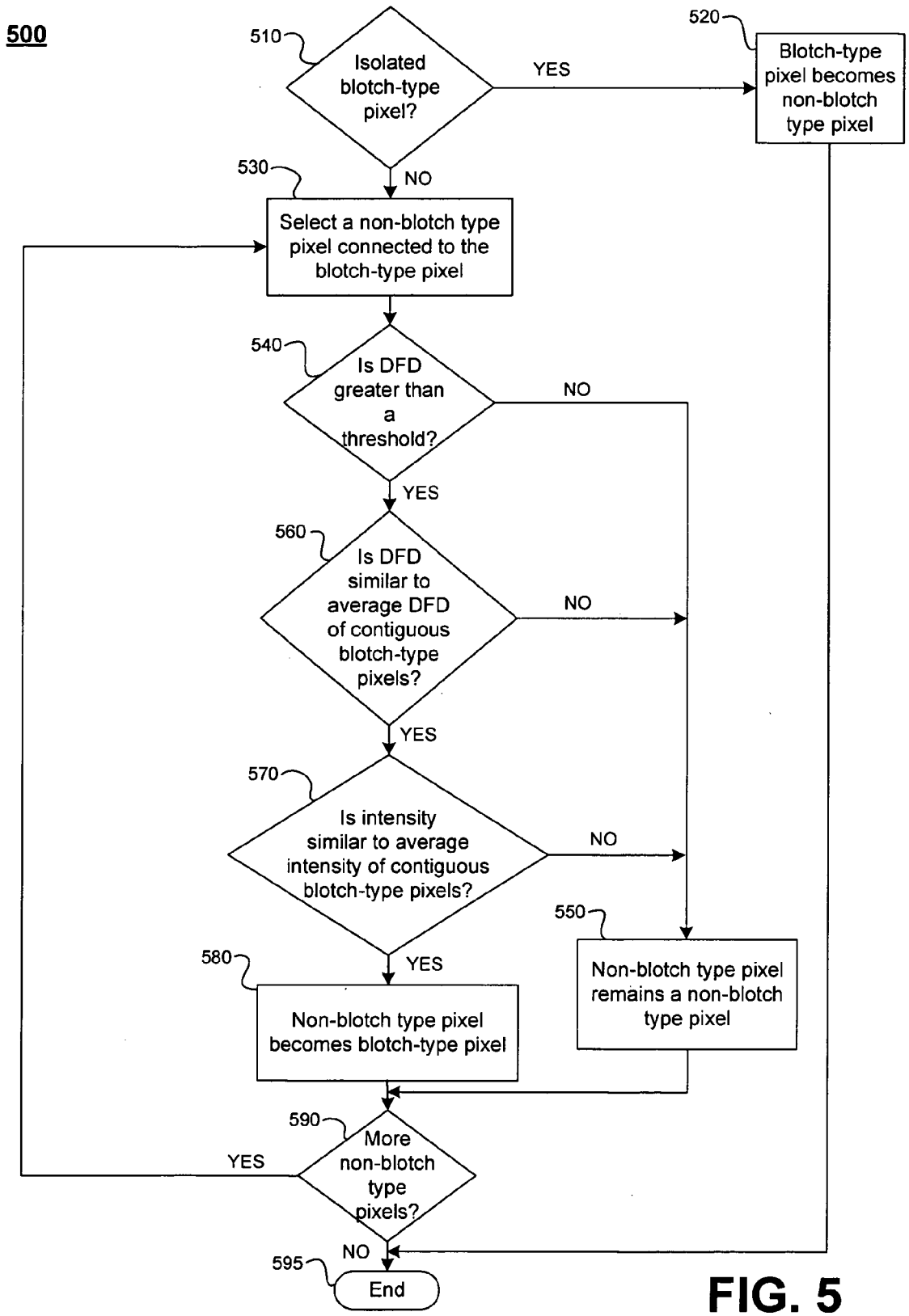
FIG. 5 illustrates a set of refinement steps based on spatial neighborhoods to complete partially detected blotches or to remove falsely identified blotches.

FIG. 5 illustrates an example implementation of a set of refinement steps that incorporates spatial information to complete partially detected blotches or to remove locations that may have been falsely identified as blotches. A process 500 may be performed, for example, for each blotch-type pixel identified in operation 332 or for other types of regions such as multiple-pixel regions. Process 500 determines whether a particular blotch-type pixel is an isolated blotch-type pixel (510) by determining, for example, whether there are any other blotch-type pixels within a particular distance of the particular pixel. For example, operation 510 may determine whether the particular pixel is separated from all other blotch-type pixels by at least one pixel. If the particular pixel is isolated ("yes" branch from operation 510), then the particular pixel is reclassified as a non-blotch type pixel (520) and process 500 ends (595).

If the particular blotch-type pixel is not isolated ("no" branch from operation 510), then process 500 selects a non-blotch type pixel that is connected to the particular blotch-type pixel (530). Process 500 determines if the DFD of the selected non-blotch type pixel is greater than a threshold (540). The DFD may be determined, for example, with respect to one or more reference frames, and the threshold may be, for example, constant or adaptive. If the DFD is less than or equal to the threshold ("no" branch from operation 540), then the selected non-blotch type pixel remains a non-blotch type pixel (550). However, if the DFD is greater than the threshold ("yes" branch from operation 540), then process 500 continues processing the selected non-blotch type pixel with operation 560.

Process 500 determines if the DFD of the selected non-blotch type pixel is similar to the average DFD for blotch-type pixels that are contiguous to the selected non-blotch type pixel (560). The contiguous pixels may be those pixels, for example, bordering the selected pixel on any of the four sides or the four corners of the selected pixel. The contiguous pixels can also be those pixels that have already been identified as belonging to the partially complete current blotch that is contiguous to the selected non-blotch pixel. Similarity of the DFDs may be determined, for example, by determining whether the DFDs are within a particular threshold of each other, with the threshold being, for example, an absolute number or a percentage. If the DFDs are not similar ("no" branch from operation 540), then the selected non-blotch type pixel remains a non-blotch type pixel (550). However, if the DFDs are similar ("yes" branch from operation 540), then process 500 continues processing the selected non-blotch type pixel with operation 570.

Process 500 determines if the intensity value of the selected non-blotch type pixel is similar to the average intensity value for blotch-type pixels that are contiguous to the selected non-blotch type pixel (570). If the intensity values are not similar ("no" branch from operation 540), then the selected non-blotch type pixel remains a non-blotch type pixel (550). However, if the intensity values are similar ("yes" branch from operation 540), then process 500 reclassifies the selected non-blotch type pixel as a blotch-type pixel within the current blotch (580). Other implementations may omit or modify one or more of the operations 540, 560, and 570, or supplement process 500 with additional operations.

In other implementations, process 500 may be applied to more than one pixel at a time. For example, process 500 may be applied to a region including multiple pixels, and the DFD (540, 560) and intensity (570) may be computed for the entire region using, for example, an average of the DFD or intensity for each pixel in the region.

Further analysis can also be applied to each set of adjacent candidate blotch pixels to determine whether the entire set of pixels belonging to a particular blotch should be retained or rejected as candidate blotch pixels (340). A set of contiguous candidate blotch pixels is also referred to as a candidate blotch region. For example, the criteria of merit can include comparisons of each blotch dimension to minimum and maximum blotch dimensions or a comparison of the total number of pixels within a blotch to a particular threshold.

Figure 6:
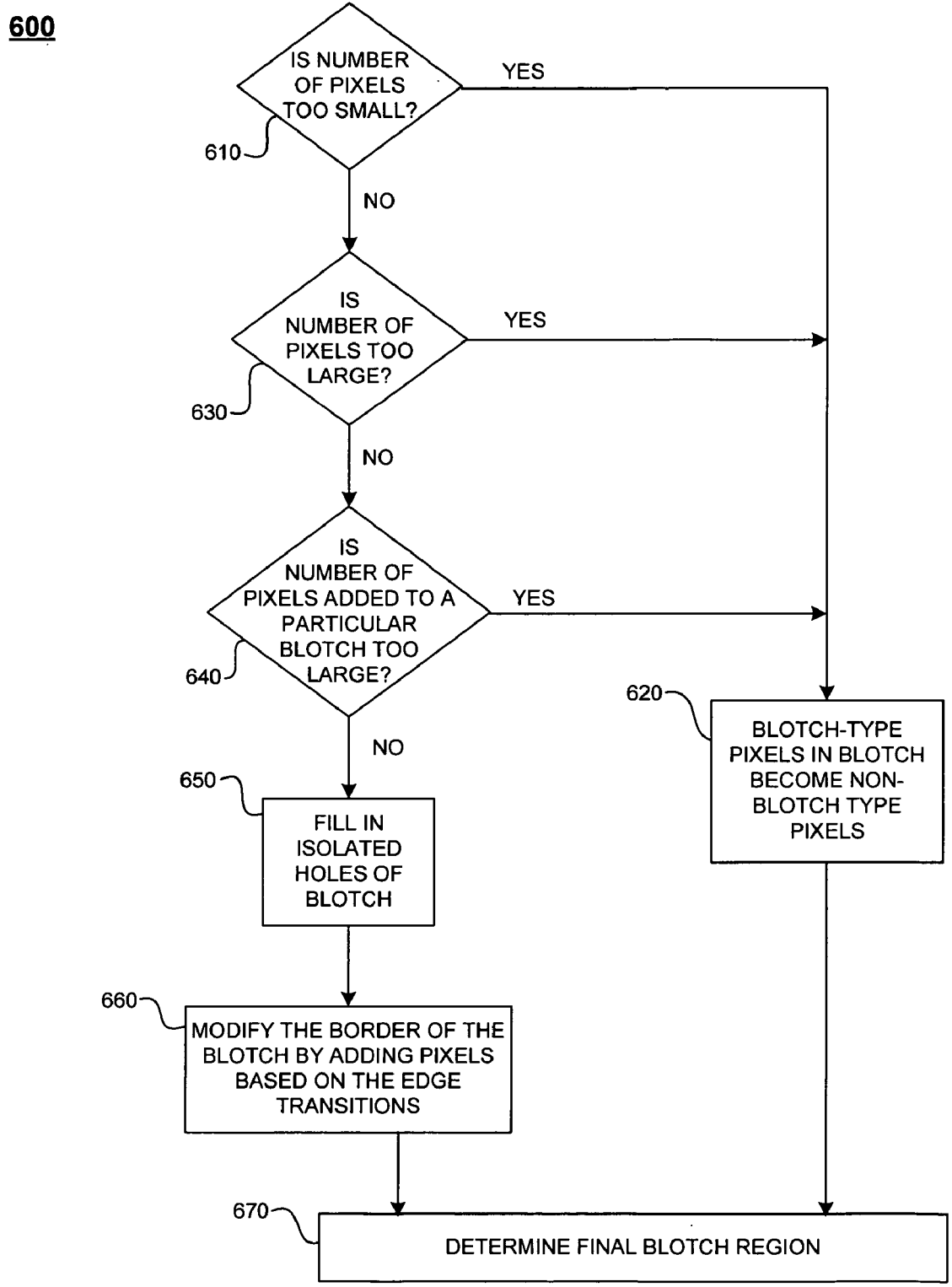
FIG. 6 illustrates a set of steps used to accept or reject a blotch region (i.e., a set of contiguous blotch pixels) in its entirety as well as to further refine the identified blotch.

FIG. 6 illustrates an example implementation of a set of refinement steps for a candidate blotch region. A process 600 includes determining whether the number of pixels in the candidate blotch region is too small (610). If a candidate blotch region is too small (e.g., 1 pixel in dimension), the candidate blotch region may be due to random noise rather than due to a blotch caused by dirt particles or other causes. In this case, a condition that compares the candidate blotch region dimension to a minimum size could lead to the removal of this region as a "blotch" if the dimension was less than the minimum. If the number of pixels in the candidate blotch region is too small ("yes" branch from operation 610), then all of the pixels in the candidate blotch region are reclassified as non-blotch type pixels (620). Else, if the number of pixels in the candidate blotch region is not too small ("no" branch from operation 610), then process 600 continues processing the candidate blotch region with operation 630.

Process 600 determines whether the number of pixels in the candidate blotch region is too large (630). If the number of pixels in a candidate blotch region is too large, it may be unlikely that the set of pixels actually belongs to a blotch (rather, the set may belong to a valid object within the image). As such, a condition that compares the candidate blotch region dimension to a maximum size could lead to the removal of the set of pixel locations as "blotch"-type pixels if the dimension exceeded the maximum.

Indeed, if the number of pixels in the candidate blotch region is too large ("yes" branch from operation 630), then all of the pixels in the candidate blotch region are reclassified as non-blotch type pixels (620). Else, if the number of pixels in the candidate blotch region is not too large ("no" branch from operation 630), then process 600 continues processing the candidate blotch region with operation 640.

Process 600 determines whether the number of pixels identified as belonging to a candidate blotch region prior to the refinement operation 336 is too large (640) in comparison to the total number of pixels identified as belonging to the candidate blotch region after the refinement operation 336. For example, if the number of pixels that were added to a particular blotch region is much larger than the number of pixels that were originally identified as belonging to a blotch region, this may indicate that the blotch region is not a valid blotch. As such, a condition that compares the increase of the blotch region size to a threshold could lead to the removal of the set of pixel locations as "blotch"-type pixels if the increase exceeded this threshold. Accordingly, if the number of pixels added to the candidate blotch region is too large ("yes" branch from operation 640), then all of the pixels in the candidate blotch region are reclassified as non-blotch type pixels (620). Else, if the number of pixels added to the candidate blotch region is not too large ("no" branch from operation 640), then the candidate blotch is accepted (340).

After accepting a blotch (containing a set of contiguous "blotch"-type pixels) as a candidate blotch region (340), a further refinement may be made to the borders of the blotch (340). For example, process 600 continues by extending the borders of the candidate blotch region (i.e., adding additional pixels at the borders of the candidate blotch region) based on where the edge transitions that characterize the candidate blotch region end (650). For example, the candidate blotch region may be extended until one pixel prior to the location where the gradient, for example, the first derivative, of the intensity values of adjacent pixels changes direction.

Process 600 applies another refinement operation by reclassifying isolated "non-blotch"-type pixels within the candidate blotch region as "blotch"-type pixels if the majority of the isolated pixel's neighboring pixels are blotch-type pixels (660). After the refinement operations (650, 660), a final blotch region is determined (670), and a classification map that indicates candidate blotch locations for each color component image is produced. This classification map is transferred from the blotch classification map determination unit 230 to the blotch modification prediction unit 240 (344, 348).

The digital color component images corresponding to the frame under consideration as well as to the reference frame(s), the associated motion vectors for the frame under consideration, and the classification map produced by the blotch classification determination unit 230 are input into the blotch modification prediction unit 240 (344, 348). The blotch modification prediction unit 240 uses the aforementioned information to accomplish two tasks on each identified set of pixels belonging to a blotch (352): (1) to determine the particular correction technique to be used to restore the pixels within the blotch, and (2) to determine whether or not the blotch modification resulting from the application of the particular correction technique identified in (1) should be accepted. The particular correction technique that is determined may be based on temporal information, spatial information, or both temporal and spatial information. Further, determining the correction technique may include one or more of determining or refining a motion vector, and determining a prediction method.

In one implementation of the system, predictions of the restored blotch pixels in the color component having the candidate blotch are determined, and predictions of the corresponding pixels in the other two color components are determined. Various tests are then performed on the predicted restored blotch to determine whether the result of the prediction is an appropriate removal of the blotch or an undesired introduction of artifacts. The goal of the tests is to prevent pixel value modifications at locations that have been falsely identified as blotches. If it is determined with the tests that the prediction is not appropriate, additional iterations of the two tasks of operation 352 may be performed using a correction technique.

These two tasks of operation 352 may be performed for each blotch, one blotch at a time, where all contiguous candidate "blotch" pixels are considered to be part of the same possible blotch.

For the various operations within this unit, the "block" is defined as the set of pixels contained within a box that has a size that is determined by a particular horizontal and vertical extent outside (or at least including, particularly in other implementations) the blotch area, where the blotch area is the set of pixels belonging to a particular blotch.

Figure 7:
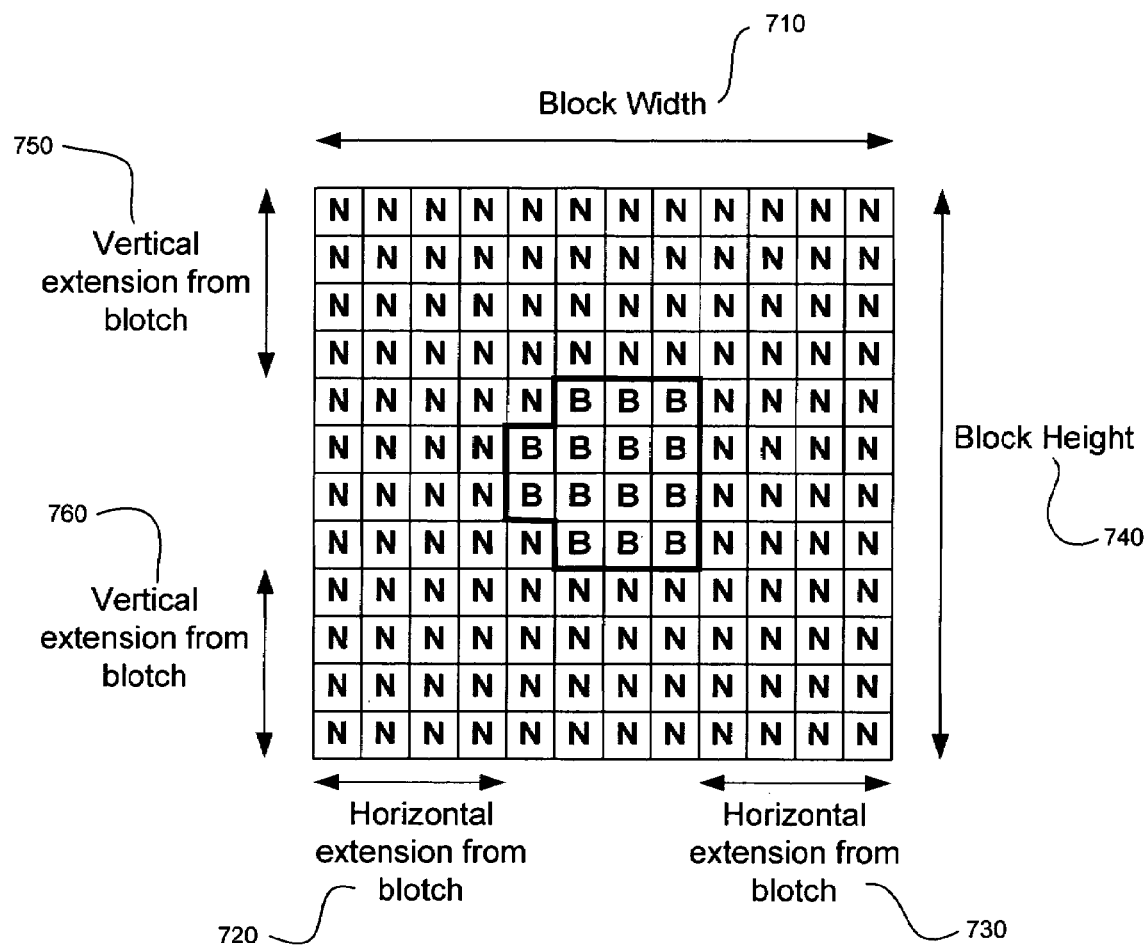
FIG. 7 illustrates an example of a block containing a blotch that is used in a blotch modification prediction unit.

FIG. 7 illustrates an example of a block 700 containing a blotch. There are fourteen "blotch"-type pixels indicated with a "B," and the remaining pixels are "non-blotch"-type pixels indicated with an "N." Note that block 700 is different than that used in the motion estimation unit 220. Block 700 has a block width 710 that includes a left horizontal extension 720 from the blotch and a right horizontal extension 730 from the blotch. Block 700 also has a block height 740 that includes a top vertical extension 750 from the blotch and a bottom vertical extension 760 from the blotch.

Figure 8:
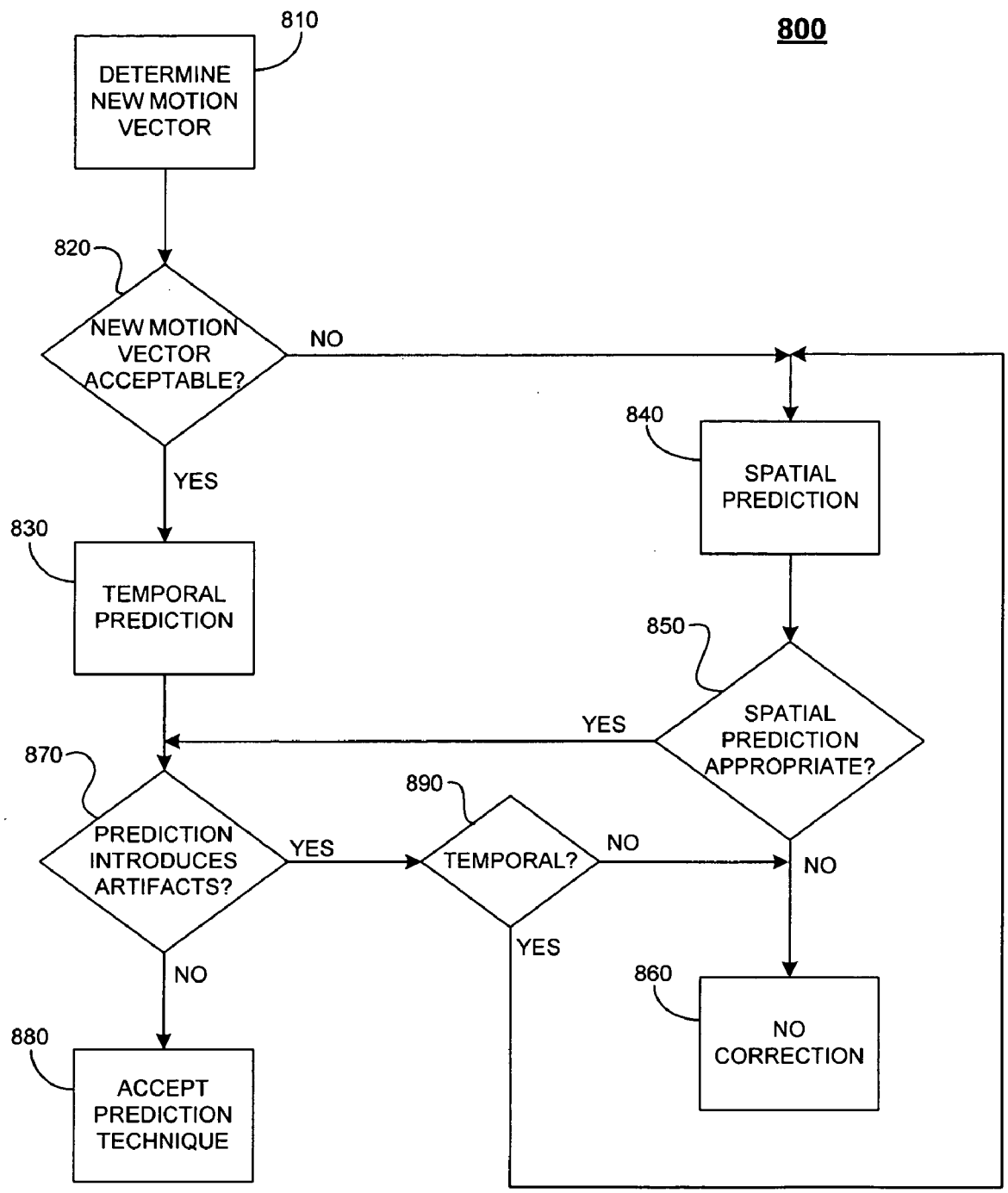
FIG. 8 illustrates one implementation of a set of operations applied in the blotch modification prediction unit.

FIG. 8 illustrates one implementation of a set of operations, applied in the blotch modification prediction unit 240, that corresponds to operation 352. A process 800 determines the "appropriate" (or "new") motion vector for a block with a blotch (810). The new motion vector may be chosen, for example, from a set of possible motion vectors. In one implementation of process 800, the determination of the "appropriate" motion vector is performed as follows. Initially, a motion vector is determined for the block in the corresponding color component that contains a blotch. This determination may be performed using a number of techniques.

In one implementation, this motion vector is determined using only those pixels in the block that were identified as being non-blotch pixels, e.g., the pixels labeled "N" in FIG. 7. In this way, the possible blotch pixels will not incorrectly impact the motion vector calculated for the block. The motion vector that results in the motion prediction with the least distortion for the non-blotch pixels in the block is chosen as the "appropriate" motion vector.

As an example, a candidate motion vector may be determined by using a vector determined in motion estimation unit 220 for the blotch under consideration (note that the blocks used in motion estimation 220 were not necessarily defined with respect to a blotch), or using a vector from a nearby blotch, or using a vector determined by considering other component images. A distortion value based on a distortion measure (such as DFD) may be computed for the candidate motion vector using only non-blotch pixels (or otherwise), and the distortion values associated with a number of candidate vectors (which may be obtained throughout a window around an initial candidate motion vector) may be computed. The candidate motion vector resulting in the lowest distortion value may be selected as the "appropriate" motion vector. As another example, an "appropriate" motion vector may be determined by selecting the vector that produces the lowest distortion value for the corresponding block in the other component images.

Process 800 includes performing an additional test to determine if the selected motion vector is acceptable (820). In one implementation, the selected motion vector is applied to the block in one of the two color components that does not have the possible blotch. A comparison is made between the performance of the motion prediction on those pixels that correspond to the pixels identified as a blotch (e.g., the pixels at the same pixel locations as those identified as "B" in FIG. 7) and those pixels that correspond to the pixels identified as non-blotch (e.g., the pixels at the same pixel locations as those identified as "N" in FIG. 7). In particular, the displaced frame differences of these two parts, with respect to the reference frame, are calculated. If the two displaced frame differences are within a threshold, indicating that the motion vector computed using the "non-blotch"-type pixels is appropriate (i.e., the motion vector captures the correct motion) for the "blotch"-type pixels within the block, then the motion vector is accepted.

The two displaced frame differences might not be within the threshold if, for example, the block is part of a relatively uniform object (so that multiple motion vectors may produce similarly low distortion) with the non-blotch-type pixels being relatively uniform but the blotch-type pixels having some information. In such a case, motion estimation using only the non-blotch-type pixels might be inaccurate and determine that another relatively uniform section of the object (which produces low DFD) reflects the proper motion vector. However, if such a motion vector results in the loss of the information of the blotch-type pixels in the other color components, then the DFD of the blotch-type pixels may be large enough (compared to the DFD of the non-blotch-type pixels) to reveal the inaccuracy of the motion vector.

If the selected motion vector is acceptable ("yes" branch from operation 820), then a prediction for the blotch pixels in the block is determined using the chosen (selected) motion vector (830). For example, the pixels in the reference frames that have been computed to correspond to the "blotch"-type pixels in the current frame are used to replace those "blotch"-type pixels in the current frame. In one implementation, the reference pixels are used directly as a replacement. In an alternative implementation, a function of the reference pixels can be used to obtain the replacement. For example, this may be a weighted average of the pixels in the corresponding reference frames. Thereafter, operations (for example, operations to implement the second task of operation 352) are performed in order to determine whether blotch modification would introduce undesired artifacts at the previously determined blotch locations.

If the displaced frame differences on the aforementioned two parts (i.e., the set of "N" pixels and the set of "B" pixels within the block) are not similar to each other (e.g., the two differences differ by more than a particular threshold), the motion vector is deemed not acceptable and temporal prediction will not be used to restore the block ("no" branch from operation 820). Additionally, if the restored blotch using temporal prediction (830) introduces artifacts (870), as explained below, then temporal prediction will not be used. In each of these cases, process 800 determines a prediction for the restored blotch using spatial information (840).

In one implementation, a spatial prediction is performed using linear interpolation between the pixel values along either the horizontal or vertical axis of the possible blotch. The direction of the interpolation can be determined in several ways. One possible method is to choose the direction that has the smaller extent across the possible blotch.

Process 800 determines whether the spatial prediction seems appropriate (850) by, for example, determining whether the spatially predicted restoration satisfies one or more criteria. In one implementation, the spatial interpolation can be performed on one or more of the other two color components at the corresponding location of the possible blotch. Assuming both other color components are processed with this test, distortion measures can then be computed between the predicted pixels and the original pixels for the other color components. If the distortion for either color component is above a particular threshold, it is deemed that spatial interpolation is not appropriate. This is because the other color components are typically not expected to be changing much because these other color components do not contain a blotch in that location. If replacing these other color components with pixel values obtained with spatial interpolation causes the values to be very different, then it may imply that spatial interpolation would not produce a good replacement for the blotch in the color component that contains the blotch. Accordingly, in process 800, if spatial prediction does not seem appropriate ("no" branch from operation 850), then no correction is performed and the pixels retain their original intensity values (860). In such cases (860), it may often be assumed that the candidate blotch was not really a blotch.

However, if spatial prediction does seem appropriate ("yes" branch from operation 850), then operations (for example, operations implementing the second task of operation 352) are performed in order to determine whether blotch modification would introduce undesired artifacts at the previously determined blotch locations. The spatial prediction may seem appropriate if, for example, the distortion for both of the other color components is below a particular threshold. Operations, such as, for example, operations corresponding to the second task of operation 352, are also performed after performing a temporal prediction (830).

In process 800, an implementation of the second task of operation 352 begins with operation 870, which determines if the prediction (spatial or temporal) introduces an artifact (870). In one implementation, a particular measure is computed on the block of the color component with the possible blotch using the pixels in the block before the predicted restoration of the block, and the same measure is computed using the pixels in the block after the predicted restoration of the block. The measure may be, for example, the variance of the block. The same measure is computed for the other two color components using corresponding sets of pixels. These computed values are then used to determine if the restored prediction of the block would benefit the block or introduce undesired artifacts.

For example, consider the case in which variance is used as the measure. If an actual blotch occurred within a color component image (this component will be referred to as the first color component in the remainder of this example), it is likely that the variance of the block that contains this blotch within this color component would decrease a large amount after it has been replaced by pixels from the corresponding reference frames. This is because the blotch would usually have very different intensity values compared to the other pixels in the block, thus leading to higher variance within the block before restoration. In contrast, the pixels used to replace the blotch would be more similar to the other pixels in the block since the replacement is intended to be a good representation of the original, unblotched pixel values (thus leading to a much lower variance within the block after restoration). Because the other color component images of the frame under consideration do not contain blotches in the corresponding blotch area, the corresponding pixels in the other color component images in a reference frame should be similar to the pixels being replaced in the other color component images of the frame under consideration. As such, the variance of the block within the other color component images should not be changed much after the "predicted" restoration in these other color components images.

This motivates a set of criteria to be used based on variance to determine whether the blotch in the first color component image should be replaced or whether it has been falsely identified as a blotch. In particular, the change in variance that results when the candidate blotch is replaced is computed for the block in the component containing the blotch. The change in variances for the other color component images are computed when the set of pixels corresponding to the same locations as the "blotch"-type pixels within the block in the first component are replaced with pixels within these other color component images (through either temporal or spatial interpolation of these other color component images). In the case where the reduction of variance in the block within the color component containing the blotch exceeds a particular threshold (either constant or adaptive), and the change in variances of the corresponding block for the other color component images are less than a particular threshold, the candidate blotch is probably an actual blotch and it therefore retains its blotch classification.

However, there are conditions on the variance that may indicate that the blotch has been falsely identified or that the replacement pixels chosen are not appropriate for that blotch and thus should not be used. For example, if the correction of the blotch does not reduce the variance of the block in the component image with the candidate blotch, then it is deemed not to be a candidate blotch, and the original pixel values at the possible blotch locations are retained.

Another example where replacement of the blotch is deemed undesirable occurs in the case where there is a reduction of variance for the block within the color component image containing the blotch that exceeds a particular threshold (either constant or adaptive) and the reduction in variance of the block for the other color component images also exceeds a particular threshold. In this case, it is likely that the candidate blotch was not actually a blotch. As explained above, this is because the other color components images, which do not contain a blotch for the set of pixels under consideration, should not be impacted much by a replacement of these pixels, since these pixels are intended to represent good replacements for the block (this is the motivation for using these pixels to replace the "blotch"-type pixels in the first color component). If the variance was reduced by replacement of the pixels in the other color component images as well as the color component image with the candidate blotch, then it is likely due to the fact that the area that the candidate blotch covers actually characterizes a particular valid object within the frame that was different from other pixels within the block (e.g., through different motion of this object). As such, the candidate blotch is not modified, and the original pixel values at the block locations are retained.

To elaborate, suppose a particular candidate blotch in the red color component is being analyzed to see whether or not it is a valid blotch. Define P_r as the set of pixels corresponding to the "block" containing the particular blotch in the red color component. Define PRest_r as the set of pixels corresponding to the block after the blotch within it has been "restored" by a particular technique, as described in the first process above. Define P_g and P_b as consisting of the same set of pixels as those in P_r. Define PRest_g as the set of pixels in the green color component that corresponds to the block after applying the same restoration technique as that used to generate PRest_r, and define PRest_b as the corresponding set of pixels in the blue color component. Also, define Var(x) as the variance on the set of pixels defined by the set x. Then one example of a set of conditions is as follows:

(i) If (Var(P_r)/Var(PRest_r)>1+Threshold1) and (Var(P_g)/Var(PRest_g) is close to one) and (Var(P_b)/Var(PRest_b) is close to one), then replace the set of pixels corresponding to the blotch in the red color component;

(ii) Otherwise, do not replace the set of pixels corresponding to the blotch in the red color component.

Additional conditions can be used to account for cases where Var(P_r) and Var(PRest_r) are high. For example, if the variances are high, then the variances might not provide meaningful information. In such a case, a different measure, such as, for example, an average, may be used. Note that an average also may be used when the variances are not high.

Here the various thresholds (including those corresponding to "close to one") can be constant or can be adaptive. In addition, Threshold1, as indicated here in this particular implementation, is a positive number. "Close to one" may define a range that is, or is not, symmetric about the value of one. In one implementation, the thresholds listed above are determined by machine learning on training data. In another implementation, a number of different measures are considered and a classifier is developed using machine learning to provide the set of measures (or a function of the measures) and the associated thresholds for the determination. For example, both variance and average measures can be used and different thresholds can be applied to each measure. In one implementation, an average measure is used for applications in which a blotch occurs in a high-variance area of a color component image because the variance, rather than decreasing, may remain relatively constant or may increase when the blotch pixels are replaced. Machine learning refers, for example, to the use of training data having known characteristics, thereby allowing the machine to iterate through various measures and thresholds and evaluate the success of each.

Process 800 accepts the selected prediction technique (spatial or temporal) (880) if the prediction technique does not introduce artifacts ("no" branch from operation 870). However, if the prediction technique introduces artifacts ("yes" branch from operation 870), then process 800 determines whether the prediction technique is temporal (890). If the prediction technique is temporal, and introduces artifacts ("yes" branch from operation 890), then process 800 attempts to perform a spatial prediction (840). However, if the prediction technique is spatial and introduces artifacts ("no" branch from operation 890), then process 890 does not correct the candidate blotch and the pixels retain their original intensity values (860). In various implementations, multiple algorithms may be selected by the first task of operation 352, and the second task of operation 352 may be used to select among these algorithms. It is also possible, as just indicated, that no algorithm is selected by unit 240.

After the steps outlined in this section, the blotch modification prediction unit 240 produces the refined classification map, which may also designate the particular blotch correction technique used for each blotch (including any refined motion vectors) and transfers this information to the blotch modification application unit 250 (360, 364).

After the blotch modification prediction unit 240 has been applied, the blotch modification application unit 250 is used to restore those pixels that were identified as blotches (368). The pixels for each blotch are restored using the blotch modification prediction method chosen in the blotch modification prediction unit 240. All pixels identified as non-blotch pixels remain unchanged. In other implementations, blotch modification prediction unit 240 also may apply the algorithm(s)/technique(s) that are selected in unit 240, rather than using a separate unit to apply the algorithm(s)/technique(s).

Various implementations may correct blotches in a given component, for a given frame, on the fly, and may base subsequent decisions as to whether/how to correct another blotch in the given component (and frame) on the blotch-corrected data. Further, implementations may correct blotches in a given component (and frame) all at once after all identified blotches in that component (and frame) have been processed. Then, blotch correction of further components for that frame would be based on the blotch-corrected data of the previously processed component. More generally, correction for further components or frames may be based on corrected data for previous components or frames.

Additional processing may also be performed. For example, after all blotches in a given component of a frame, in all components of a frame, or in several frames have been corrected/restored, a further test may be performed to analyze the aggregate impact of the restorations. Such a test may include calculating another distortion measure for one or more blotch areas based only on the corrected data.

Figure 9A:
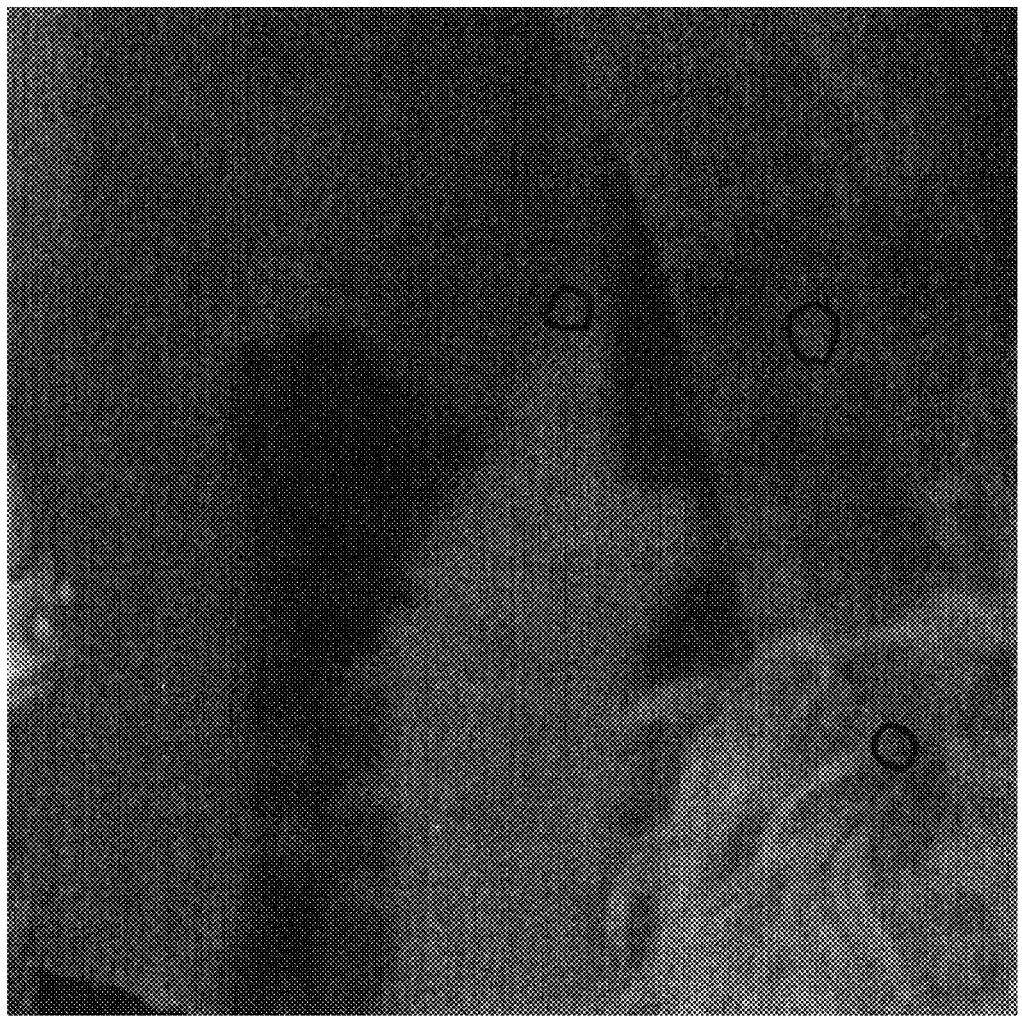
FIG. 9A is a color picture illustrating a result of applying one implementation of a blotch correction technique to the picture in FIG. 1. The three locations where blotches were illustrated in FIGS. 1A and 1B are circled in this figure.
Figure 9B:
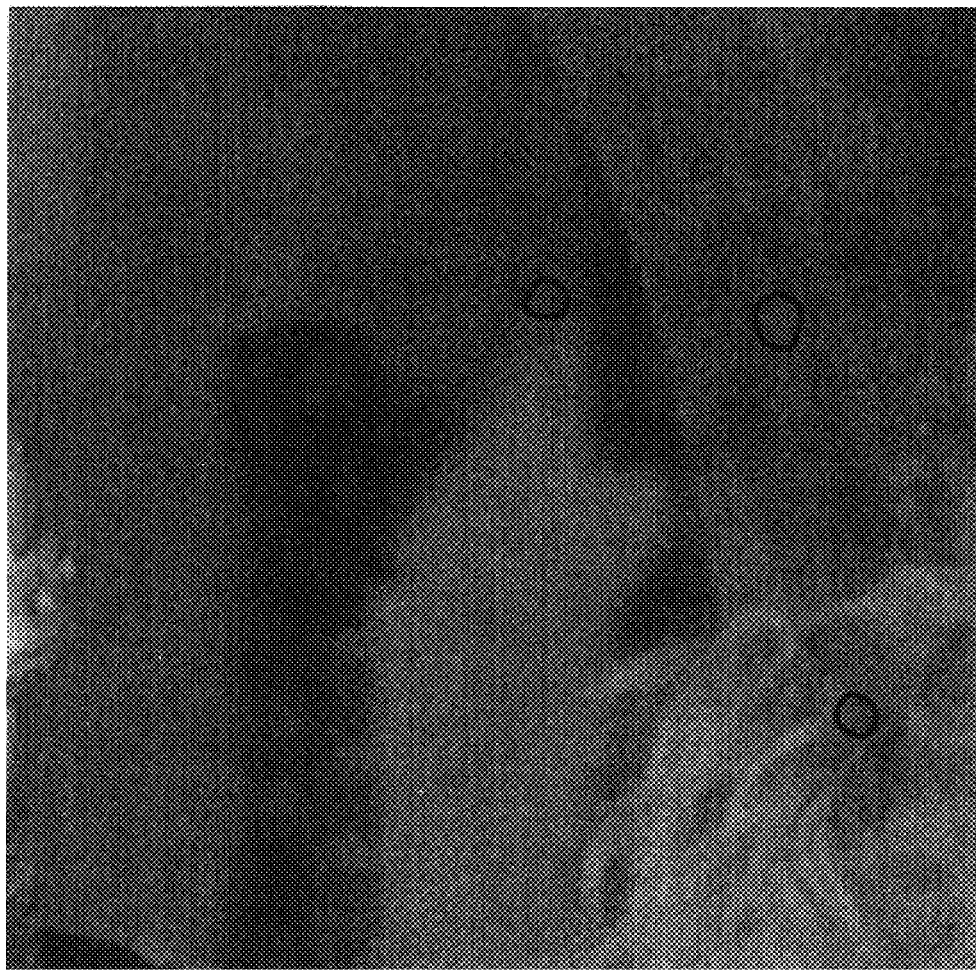
FIG. 9B is a non-color version of FIG. 9A.

Once the color component images have been modified by the blotch modification application unit 250, the modified images are provided to the composite phase unit 260 (372, 376) and the modified images are recombined into a composite color frame by the composite phase unit 260 (380). FIG. 9A illustrates a color version of a composite frame after the composite phase unit 260 has been applied to the three color component images and FIG. 9B illustrates a non-color version. The locations where blotches occurred on FIGS. 1A and 1B are circled in FIGS. 9A and 9B. In one implementation, a laser film printer is optionally used to avoid the loss of resolution incurred with an optical printer.

Various of the implementations described do not assume that a blotch takes on a particular regular shape (e.g., circular, ellipsoid, or rectangular-shaped). Further, various of the implementations described do not replace areas strictly using a particular shape, such as by, for example, replacing areas on a block-by-block basis. Rather, various of the described implementations attempt to determine the shape of a blotch based on the particular characteristics of that blotch. Because a blotch may be arbitrary in shape, the shape determined for the blotch by one or more of the various described implementations also may be arbitrary in shape and may have, ideally, the same shape as the actual blotch.

Thus, if an image includes an arbitrarily shaped blotch, for example, an irregularly shaped blotch, and the blotch has been modified using the arbitrary shape of the blotch, then one of the described implementations may have been used to modify the blotch. Whether an arbitrary shape of a blotch has been identified and used to modify a blotch (e.g., an actual blotch or a suspected blotch) may be determined, for example, by determining the shape of the replaced portion of an image. The shape of the replaced portion of an image may be determined if the replaced portion of the image shows differences in color with a neighboring non-blotch, non-replaced portion of the image. Such differences may be due to imperfect color matching in the replaced portion of the identified blotch. Such imperfect color matching may arise, for example, from using the color from a corresponding area of a reference image. Ideally, these differences should be minimal, and various described implementations attempt to minimize the differences by applying various tests and replacement techniques.

Additionally, it is possible that application of one or more of the described implementations will produce other artifacts, particularly if only a portion of a described implementation is performed. One type of artifact may result if the arbitrary shape of a blotch is not perfectly identified and, in particular, if part of the blotch is not included in the identified blotch. In such a situation, part of the blotch might not be modified, leaving, for example, a smaller unmodified portion of the blotch adjacent to a larger area representing the modified portion of the blotch. The unmodified portion of the blotch may have a color that varies considerably from neighboring areas.

Further, artifacts also may result if non-blotch pixels are falsely identified as blotches (i.e., if there are false positives) and modified. These non-blotch artifacts may be more significant than the blotch artifacts, and may, for example, replace an actual object in an image. One or more of the described pruning algorithms may help to reduce the number of false positives.

Figure 10A:
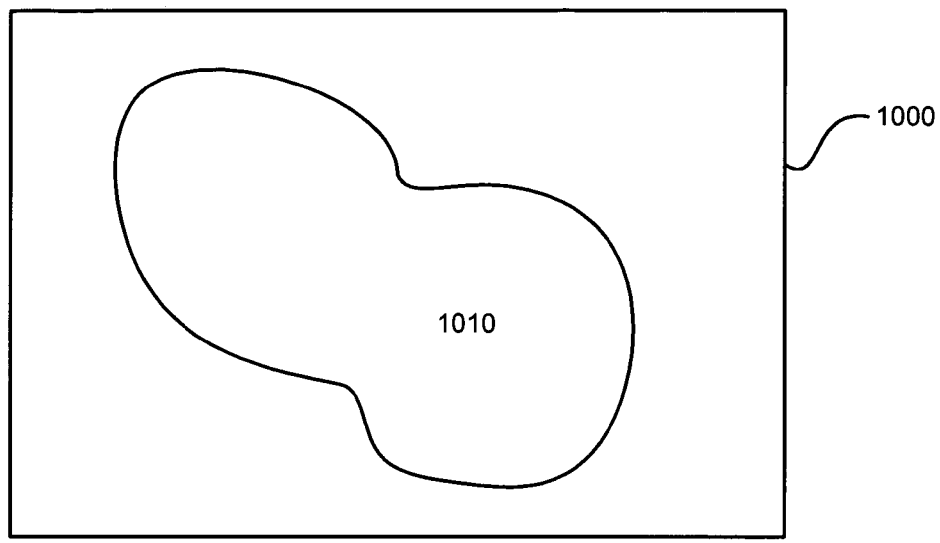
FIGS. 10A-C illustrate incomplete identification of a blotch's boundaries.
Figure 10B:
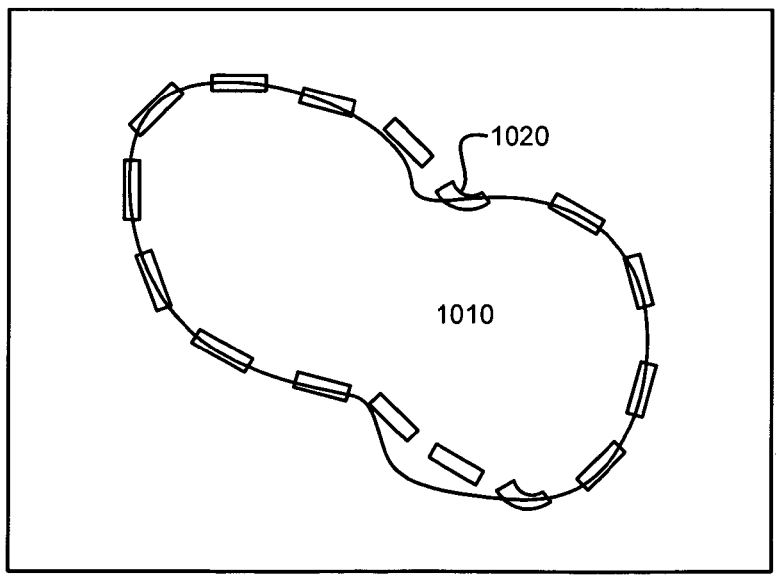
Figure 10C:
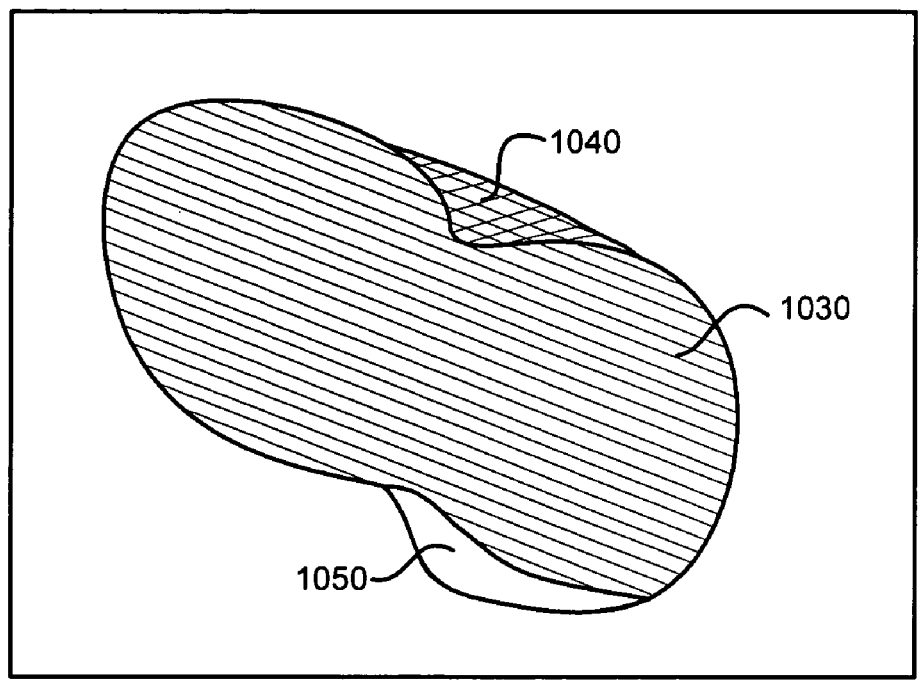

Referring to FIG. 10a, a portion 1000 of an image includes a blotch 1010 of arbitrary, and irregular, shape. Referring to FIG. 10b, an algorithm detects blotch 1010 but determines that blotch 1010 has a shape indicated by a dashed contour 1020. Referring to FIG. 10c, dashed contour 1020 defines an estimated blotch 1030 having an arbitrary and irregular shape, indicated by hatched lines. As shown in FIG. 10b, dashed contour 1020 perfectly tracks the shape of blotch 1010 except for two areas. As shown in FIG. 10c, the first of these two areas is an overshoot of dashed contour 1020 that includes a non-blotch area 1040 (indicated with cross-hatched lines) within dashed contour 1020 and within estimated blotch 1030. The second of these two areas is an undershoot of dashed contour 1020 that omits a blotch area 1050, having an arbitrary and irregular shape, from within dashed contour 1020 and from within estimated blotch 1030. Upon modification of the area within estimated blotch 1030, estimated blotch 1030 may be referred to as a modified blotch (or a modified estimated-blotch).

Assuming a perfect color replacement of estimated blotch 1030, FIGS. 10a-c still produce an artifact as a result of not modifying blotch area 1050. Area 1050 may have an arbitrary color depending on the nature of the blotch. Further, assuming that estimated blotch 1030 is not perfectly restored in color, then the modification of estimated blotch 1030 (that is, modified estimated-blotch 1030) itself may appear as an artifact. Modified estimated-blotch 1030 may have an arbitrary color depending on the algorithm used to replace/modify estimated blotch 1030. However, various described implementations perform good color matching, so modified estimated-blotch 1030 typically does not differ significantly in color from the surrounding area (except for blotch area 1050).

As such, various described implementations may produce arbitrarily shaped areas of replacement pixels. These areas (e.g. modified estimated-blotch 1030) may have color that is slightly different from a neighboring area, and perhaps very similar to previous or succeeding frames if temporal interpolation is used. These areas also may have color that varies significantly and incorrectly from the neighboring area, particularly if only a portion of a described implementation is performed. Also, various described implementations may produce (particularly if only a portion of a described implementation is performed) arbitrarily shaped artifacts (e.g. blotch area 1050) that may vary in color from a neighboring area. Further, the occurrence of such arbitrarily shaped areas or artifacts may reveal that at least a portion of one of the described implementations has been applied to the image.

The implementations and techniques described above can be applied to a variety of applications in which blotches can occur on one or more of multiple component images, such as, for example, on separations. Examples include spectral and non-spectral separations. Spectral separations are used, for example, in: (1) color film applications capturing, for example, different color frequencies, (2) astronomical applications capturing, for example, radio frequencies and/or optical frequencies, and (3) medical applications capturing, for example, different magnetic (MRI), X-ray, and sound (ultrasound) frequencies. As the last example illustrates, spectral separations may be captured from various frequency sources, including, for example, electromagnetic and sound waves. Non-spectral separations may be obtained from, for example, variations in pressure, temperature, energy, or power.

A number of implementations have been described. Nevertheless, it will be understood that various modifications may be made without departing from the spirit and scope of the claims. For example, the features, operations, or components of one or more of the implementations described may be modified, omitted, combined, and supplemented to produce other implementations. Additionally, implementations and features may be implemented in a process, a device, a combination of devices employing a process, or in a computer readable medium of a storage device (for example, an external or internal hard disk, a floppy disk, a CD, a DVD, a cassette, a tape, ROM, RAM, or a programmable device) or a programmable device (for example, a processor, programmable logic device, application specific integrated circuit, or controller chip) embodying instructions (in, for example, software, firmware, or hardware) for such a process. A computer readable medium also may include electromagnetic waves encoding or transmitting instructions.

Further, implementations and features may be implemented in a software carrier that may include, for example, a storage device or programmable device having a computer readable medium, or another device that can carry software. A software carrier also may include a waveform and need not be computer readable. Additionally, software carried by a software carrier may include, for example, one or more of source code, executable code, and data.

One such device is, for example, a computer including a programmable device with appropriate programmed instructions and, if needed, a storage device. The computer may include, for example, one or more general-purpose computers (for example, personal computers), one or more special-purpose computers (for example, devices specifically programmed to communicate with each other), or some combination.

Further, images may be stored on a storage device. For example, a DVD may be used to store a single image or an entire movie that has been processed with a described implementation. The DVD, or other storage device, also may store an unmodified image, such that a user may view both the unmodified and modified image(s). Such DVDs, or other storage devices, may be provided to users to allow users to view the images, such as by providing a DVD with a restored/ modified version of a famous movie. Such storage devices also include, however, computer hard drives and other storage devices used to produce and store modified images, such as a storage device of a computer of an engineer developing blotch-modification algorithms.

Accordingly, other implementations are within the scope of the following claims.

What is claimed is:

1. A method of processing images containing a blotch, the method comprising:
   using at least one processor to perform operations comprising:
   accessing one or more component images of a target image, the target image including a first component image and a second component image;
   accessing one or more component images of a reference image, the reference image including a first component image and a second component image;
   determining a motion vector characterizing motion between the target image and the reference image;
   comparing, based on motion indicated by the motion vector, the first component image of the target image with the first component image of the reference image to produce a first-component comparison result;
   comparing, based on motion indicated by the motion vector, the second component image of the target image with the second component image of the reference image to produce a second-component comparison result; and
   determining that the first component image of the target image includes a blotch based on the first-component comparison result and the second-component comparison result,
   wherein comparing the first component image of the target image with the first component image of the reference image comprises determining a first-component difference between intensities of (i) a given pixel having a given location in the first component image of the target image and (ii) a corresponding pixel in the first component image of the reference image, the corresponding pixel in the first component image of the reference image being determined based on motion indicated by the motion vector,
   wherein comparing the second component image of the target image with the second component image of the reference image comprises determining a second-component difference between intensities of (i) a pixel having the given location in the second component image of the target image and (ii) a corresponding pixel in the second component image of the reference image, the corresponding pixel in the second component image of the reference image being determined based on motion indicated by the motion vector, and
   wherein determining that the first component image of the target image includes the blotch comprises identifying the given pixel as being part of the blotch based on the first-component difference and the second-component difference.

2. The method of claim 1 wherein the first component image of the target image comprises a color image.

3. The method of claim 2 wherein the second component image of the target image comprises a color image.

4. The method of claim 1 wherein the target image comprises a color image.

5. The method of claim 1:
   further comprising determining a third-component difference between intensities of (i) a pixel having the given location in a third component image of the target image and (ii) a corresponding pixel in a third component image of the reference image, the corresponding pixel in the third component image of the reference image being determined based on motion indicated by the motion vector, and wherein identifying the given pixel as being part of the blotch comprises identifying the given pixel as being part of the blotch if:
(i) the first-component difference minus the second-component difference exceeds a first/second-component threshold,
(ii) the first-component difference minus the third-component difference exceeds a first/third-component threshold,
(iii) the second-component difference is less than a second-component threshold, and
(iv) the third-component difference is less than a third-component threshold.

6. The method of claim 1 wherein the determined motion vector is based on at least a portion of the first component image of the target image and at least a portion of the second component image of the target image.

7. A method of processing images containing a blotch, the method comprising:
using at least one processor to perform operations comprising:
accessing one or more component images of a target image, the target image including a first component image and a second component image;
accessing one or more component images of a reference image, the reference image including a first component image and a second component image;
determining a motion vector characterizing motion between the target image and the reference image;
comparing, based on motion indicated by the motion vector, the first component image of the target image with the first component image of the reference image to produce a first-component comparison result;
comparing, based on motion indicated by the motion vector, the second component image of the target image with the second component image of the reference image to produce a second-component comparison result; and
determining that the first component image of the target image includes a blotch based on the first-component comparison result and the second-component comparison result,
wherein determining the motion vector comprises:
determining a first value for first-component distortion characterizing distortion in the first component image of the target image associated with applying a first candidate motion vector to the first component image of the target image;
determining a first value for second-component distortion characterizing distortion in the second component image of the target image associated with applying the first candidate motion vector to the second component image of the target image;
determining a first value for a distortion function characterizing distortion from multiple component images of the target image associated with applying the first candidate motion vector to the multiple component images of the target image;
determining a second value for first-component distortion characterizing distortion in the second component image of the target image associated with applying a second candidate motion vector to the first component image of the target image;

determining a second value for second-component distortion characterizing distortion in the second component image of the target image associated with applying the second candidate motion vector to the second component image of the target image;
determining a second value for the distortion function characterizing distortion from multiple component images of the target image associated with applying the second candidate motion vector to the multiple component images of the target image; and
evaluating the second candidate motion vector based on the relative values of the first and second values of (1) first-component distortion, (2) second-component distortion, and (3) the distortion function.

8. The method of claim 7 wherein evaluating the second candidate motion vector comprises:
making a determination that the first value of at least one of (1) first-component distortion, (2) second-component distortion, and (3) the distortion function is less than the respective second value; and
favoring the second candidate motion vector based on the determination.

9. The method of claim 8 wherein making the determination further comprises making a determination that the first value of at least two of (1) first-component distortion, (2) second-component distortion, and (3) the distortion function is less than the respective second value.

10. The method of claim 7 wherein
determining a first value for third-component distortion characterizing distortion in a third component image of the target image associated with applying the first candidate motion vector to the third component image of the target image;
determining a second value for third-component distortion characterizing distortion in the third component image of the target image associated with applying the second candidate motion vector to the third component image of the target image;
making a component-distortion determination that the first value of at least two of (1) first-component distortion, (2) second-component distortion, and (3) third-component distortion are less than the respective second value;
making a distortion-function determination that the first value of the distortion function is less than the second value of the distortion function; and
favoring the second candidate motion vector based on the component-distortion determination and the distortion-function determination.

11. The method of claim 1 further comprising determining an extent of the blotch in the first component image of the target image.

12. The method of claim 11 further comprising refining the motion vector based on the determined extent of the blotch.

13. The method of claim 1 further comprising testing the motion vector using the second component image of the target image.

14. A method of processing images containing a blotch, the method comprising:
using at least one processor to perform operations comprising:
accessing one or more component images of a target image, the target image including a first component image and a second component image;
accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result;

determining that the first component image of the target image includes a blotch based on the first-component comparison result and the second-component comparison result; and testing the motion vector using the second component image of the target image, wherein testing the motion vector using the second component image of the target image comprises:

determining an extent of the blotch in the first component image of the target image;

applying the motion vector to pixels in a corresponding extent of a digital representation of the second component image of the target image, the corresponding extent including pixels that correspond to the determined extent of the blotch;

determining a blotch distortion value for the application of the motion vector to the pixels in the corresponding extent;

determining a region in the first component image of the target image that includes more than the determined extent of the blotch;

applying the motion vector to pixels in the digital representation of the second component image of the target image that are in a corresponding region but not in the corresponding extent, the corresponding region includes pixels that correspond to the determined region;

determining a non-blotch distortion value for the application of the motion vector to pixels that are in the corresponding region but not in the corresponding extent; and evaluating the motion vector based on the blotch distortion value and the non-blotch distortion value.

15. The method of claim 14 wherein evaluating the motion vector comprises:

determining a difference between the blotch distortion value and the non-blotch distortion value;

comparing the difference to a difference threshold; and evaluating the motion vector based on a result obtained from comparing the difference to the difference threshold.

16. The method of claim 1 further comprising performing a spatial correction in the first component image of the target image to modify the blotch.

17. The method of claim 16 further comprising:

applying the spatial correction to the second component image of the target image;

determining a spatial-correction distortion value for the application of the spatial correction to the second component image of the target image;

comparing the spatial-correction distortion value to a spatial-correction distortion threshold; and evaluating the spatial correction of the first component image of the target image based on a result obtained from comparing the spatial-correction distortion value to the spatial-correction distortion threshold.

18. A method of processing images containing a blotch, the method comprising:

using at least one processor to perform operations comprising:

accessing one or more component images of a target image, the target image including a first component image and a second component image;

accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result;

determining that the first component image of the target image includes a blotch based on the first-component comparison result and the second-component comparison result;

performing a spatial correction in the first component image of the target image to modify the blotch;

applying the spatial correction to the second component image of the target image;

determining a spatial-correction distortion value for the application of the spatial correction to the second component image of the target image;

comparing the spatial-correction distortion value to a spatial-correction distortion threshold; and evaluating the spatial correction of the first component image of the target image based on a result obtained from comparing the spatial-correction distortion value to the spatial-correction distortion threshold, wherein determining the spatial-correction distortion value comprises determining a distortion value between (1) the second component image of the target image before applying the spatial correction and (2) the second component image of the target image after applying the spatial correction.

19. The method of claim 1 further comprising performing a correction in the first component image of the target image to modify the blotch.

20. The method of claim 19 further comprising evaluating the correction using the second component image of the target image.

21. A method of processing images containing a blotch, the method comprising:

using at least one processor to perform operations comprising:

accessing one or more component images of a target image, the target image including a first component image and a second component image;

accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result;

determining that the first component image of the target image includes a blotch based on the first-component comparison result and the second-component comparison result;

performing a correction in the first component image of the target image to modify the blotch; and evaluating the correction using the second component image of the target image, wherein evaluating the correction using the second component image of the target image comprises:

determining a first-component distortion value characterizing distortion from performing the correction in the first component image of the target image;

performing the correction in the second component image of the target image;

determining a second-component distortion value characterizing distortion from performing the correction in the second component image of the target image;

comparing the first-component distortion value with the second-Component distortion value to produce a result; and evaluating the correction in the first component image of the target image based on the result.

22. The method of claim 21 wherein the first-component distortion value is based on a ratio of (i) a variance, before modification, of a particular region in the first component image of the target image, the particular region including the blotch, and (ii) a variance of the particular region after modification of the blotch.

23. A method of processing images containing a blotch, the method comprising:

using at least one processor to perform operations comprising:

accessing one or more component images of a target image, the target image including a first component image and a second component image;

accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result;

determining that the first component image of the target image includes a blotch based on the first-component comparison result and the second-component comparison result;

determining an extent of the blotch in the first component image of the target image;

determining a corresponding extent in the first component image of the reference image that corresponds to the extent of the blotch in the first component image of the target image;

modifying the blotch in the first component image of the target image using information from the corresponding extent in the first component image of the reference image;

determining a region in the first component image of the target image that includes more than the determined extent of the blotch;

determining a blotch distortion value for the determined region that includes the modification of the blotch in the first component image of the target image;

determining a corresponding extent in the second component image of the target image that corresponds to the extent in the first component image of the target image;

determining a corresponding extent in the second component image of the reference image that corresponds to the extent in the first component image of the target image;

modifying the corresponding extent in the second component image of the target image using information from the corresponding extent in the second component image of the reference image;

determining a corresponding region in the second component image of the target image that corresponds to the determined region;

determining a corresponding-region distortion value for the corresponding region that includes the modification of the corresponding extent in the second component image of the target image; and evaluating the modification of the blotch in the first component image of the target image based on the blotch distortion value and the corresponding-region distortion value.

24. An apparatus for processing images containing a blotch, the apparatus comprising:

at least one processor; and at least one computer-readable medium coupled to the at least one processor having instructions stored thereon which, when executed by the at least one processor, causes the at least one processor to perform operations comprising:

accessing one or more component images of a target image, the target image including a first component image and a second component image;

accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result; and determining that the first component image of the target image includes a blotch based on the first-component comparison result and the second-component comparison result, wherein comparing the first component image of the target image with the first component image of the reference image comprises determining a first-component difference between intensities of (i) a given pixel having a given location in the first component image of the target image and (ii) a corresponding pixel in the first component image of the reference image, the corresponding pixel in the first component image of the reference image being determined based on motion indicated by the motion vector, wherein comparing the second component image of the target image with the second component image of the reference image comprises determining a second-component difference between intensities of (i) a pixel having the given location in the second component image of the target image and (ii) a corresponding pixel in the second component image of the reference image, the corresponding pixel in the second component image of the reference image being determined based on motion indicated by the motion vector, and wherein determining that the first component image of the target image includes the blotch comprises identifying the given pixel as being part of the blotch based on the first component difference and the second-component difference.

25. An apparatus for processing images containing a blotch, the apparatus comprising:
at least one processor: and
at least one computer-readable medium coupled to the at least one processor having instructions stored thereon which, when executed by the at least one processor, causes the at least one processor to perform operations comprising:
accessing one or more component images of a target image, the target image including a first component image and a second component image;
accessing one or more component images of a reference image, the reference image including a first component image and a second component image;
determining a motion vector characterizing motion between the target image and the reference image;
comparing, based on motion indicated by the motion vector, the first component image of the target image with the first component image of the reference image to produce a first-component comparison result;
comparing, based on motion indicated by the motion vector, the second component image of the target image with the second component image of the reference image to produce a second-component comparison result; and
determining that the first component image of the target image includes a blotch based on the first-component comparison result and the second-component comparison result,
wherein determining the motion vector comprises:
determining a first value for first-component distortion characterizing distortion in the first component image of the target image associated with applying a first candidate motion vector to the first component image of the target image;
determining a first value for second-component distortion characterizing distortion in the second component image of the target image associated with applying the first candidate motion vector to the second component image of the target image;
determining a first value for a distortion function characterizing distortion from multiple component images of the target image associated with applying the first candidate motion vector to the multiple component images of the target image;
determining a second value for first-component distortion characterizing distortion in the second component image of the target image associated with applying a second candidate motion vector to the first component image of the target image;
determining a second value for second-component distortion characterizing distortion in the second component image of the target image associated with applying the second candidate motion vector to the second component image of the target image;
determining a second value for the distortion function characterizing distortion from multiple component images of the target image associated with applying the second candidate motion vector to the multiple component images of the target image; and
evaluating the second candidate motion vector based on the relative values of the first and second values of (1) first-component distortion, (2) second-component distortion, and (3) the distortion function.

26. The apparatus of claim 25 wherein evaluating the second candidate motion vector comprises:
making a determination that the first value of at least one of (1) first-component distortion, (2) second-component distortion, and (3) the distortion function is less than the respective second value; and
favoring the second candidate motion vector based on the determination.

27. An apparatus for processing images containing a blotch, the apparatus comprising:
at least one processor; and
at least one computer-readable medium coupled to the at least one processor having instructions stored thereon which, when executed by the at least one processor, causes the at least one processor to perform operations comprising:
accessing one or more component images of a target image, the target image including a first component image and a second component image;
accessing one or more component images of a reference image, the reference image including a first component image and a second component image;
determining a motion vector characterizing motion between the target image and the reference image;
comparing, based on motion indicated by the motion vector, the first component image of the target image with the first component image of the reference image to produce a first-component comparison result;
comparing, based on motion indicated by the motion vector, the second component image of the target image with the second component image of the reference image to produce a second-component comparison result;
determining that the first component image of the target image includes a blotch based on the first-component comparison result and the second-component comparison result; and
testing the motion vector using the second component image of the target image,
wherein testing the motion vector using the second component image of the target image comprises:
determining an extent of the blotch in the first component image of the target image;
applying the motion vector to pixels in a corresponding extent of a digital representation of the second component image of the target image, the corresponding extent including pixels that correspond to the determined extent of the blotch;

determining a blotch distortion value for the application of the motion vector to the pixels in the corresponding extent;

determining a region in the first component image of the target image that includes more than the determined extent of the blotch;

applying the motion vector to pixels in the digital representation of the second component image of the target image that are in a corresponding region but not in the corresponding extent, the corresponding region includes pixels that correspond to the determined region;

determining a non-blotch distortion value for the application of the motion vector to pixels that are in the corresponding region but not in the corresponding extent; and evaluating the motion vector based on the blotch distortion value and the non blotch distortion value.

28. An apparatus for processing images containing a blotch, the apparatus comprising:

at least one processor; and at least one computer-readable medium coupled to the at least one processor having instructions stored thereon which, when executed by the at least one processor, causes the at least one processor to perform operations comprising:

accessing one or more component images of a target image, the target image including a first component image and a second component image;

accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result;

determining that the first component image of the target image includes a blotch based on the first-component comparison result and the second-component comparison result;

performing a spatial correction in the first component image of the target image to modify the blotch;

applying the spatial correction to the second component image of the target image;

determining a spatial-correction distortion value for the application of the spatial correction to the second component image of the target image;

comparing the spatial-correction distortion value to a spatial-correction distortion threshold; and evaluating the spatial correction of the first component image of the target image based on a result obtained from comparing the spatial-correction distortion value to the spatial-correction distortion threshold, wherein determining the spatial-correction distortion value comprises determining a distortion value between (1) the second component image of the target image before applying the spatial correction and (2) the second component image of the target image after applying the spatial correction.

29. An apparatus for processing images containing a blotch, the apparatus comprising:

at least one processor; and at least one computer-readable medium coupled to the at least one processor having instructions stored thereon which, when executed by the at least one processor, causes the at least one processor to perform operations comprising:

accessing one or more component images of a target image, the target image including a first component image and a second component image;

accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result;

determining that the first component image of the target image includes a blotch based on the first-component comparison result and the second-component comparison result;

performing a correction in the first component image of the target image to modify the blotch; and evaluating the correction using the second component image of the target image, wherein evaluating the correction using the second component image of the target image comprises:

determining a first-component distortion value characterizing distortion from performing the correction in the first component image of the target image;

performing the correction in the second component image of the target image;

determining a second-component distortion value characterizing distortion from performing the correction in the second component image of the target image;

comparing the first-component distortion value with the second-component distortion value to produce a result; and evaluating the correction in the first component image of the target image based on the result.

30. An apparatus for processing images containing a blotch, the apparatus comprising:

at least one processor; and at least one computer-readable medium coupled to the at least one processor having instructions stored thereon which, when executed by the at least one processor, causes the at least one processor to perform operations comprising:

accessing one or more component images of a target image, the target image including a first component image and a second component image;

accessing one or more component images of a reference image, the reference image including a first component image and a second component image;

determining a motion vector characterizing motion between the target image and the reference image;

comparing, based on motion indicated by the motion vector, the first component image of the target image with the first component image of the reference image to produce a first-component comparison result;

comparing, based on motion indicated by the motion vector, the second component image of the target image with the second component image of the reference image to produce a second-component comparison result;

determining that the first component image of the target image includes a blotch based on the first-component comparison result and the second-component comparison result;

determining an extent of the blotch in the first component image of the target image;

determining a corresponding extent in the first component image of the reference image that corresponds to the extent of the blotch in the first component image of the target image;

modifying the blotch in the first component image of the target image using information from the corresponding extent in the first component image of the reference image;

determining a region in the first component image of the target image that includes more than the determined extent of the blotch;

determining a blotch distortion value for the determined region that includes the modification of the blotch in the first component image of the target image;

determining a corresponding extent in the second component image of the target image that corresponds to the extent in the first component image of the target image;

determining a corresponding extent in the second component image of the reference image that corresponds to the extent in the first component image of the target image;

modifying the corresponding extent in the second component image of the target image using information from the corresponding extent in the second component image of the reference image;

determining a corresponding region in the second component image of the target image that corresponds to the determined region;

determining a corresponding-region distortion value for the corresponding region that includes the modification of the corresponding extent in the second component image of the target image; and evaluating the modification of the blotch in the first component image of the target image based on the blotch distortion value and the corresponding-region distortion value.

* * * * *